United States Patent Office 3,647,788
Patented Mar. 7, 1972

3,647,788
CEPHALOSPORINS HAVING A 3-THIOETHER GROUP
John Colin Clark, Gerrards Cross, Brian Richard Cowley, Greenford, and Gordon Ian Gregory, Chalfont St. Peter, England, James Kennedy, Montrose, Angus, Scotland, and Alan Gibson Long, Greenford, England, assignors to Glaxo Laboratories Limited, Middlesex, England
No Drawing. Continuation-in-part of application Ser. No. 752,140, Aug. 13, 1968. This application June 13, 1969, Ser. No. 833,149
Claims priority, application Great Britain, June 14, 1968, 28,528/68
Int. Cl. C07d 99/24
U.S. Cl. 260—243 C
23 Claims

ABSTRACT OF THE DISCLOSURE 7-acylamido cephalosporanic acids and non-toxic salts thereof having a thioether group at the 3-position, the acyl group in the 7-substituent being of the aliphatic, heterocyclic araliphatic containing 1 or 2 hetero atoms, araliphatic or cycloaliphatic series, an araliphatic acyl group having an atomic weight sum of at least 120 when tne aryl moiety thereof is a carbocyclic aromatic group. Such compounds are antibiotics more resistant to metabolic processess reducing antibiotic activity than are cephalosporins possessing a 3-acetoxymethyl group and certain of them show significant absorption after oral administration.

---

This application is a continuation-in-part of our application Ser. No. 752,140, filed Aug. 13, 1968 and is concerned with cephalosporin compounds having antibacterial activity.

The cephalosporin compounds referred to in this specification are generally named with reference to cepham (see J.A.C.S. 1962, 84, 3400 and J. Chem. Soc. 1965, 5031). The term "cephem" refers to the basic cepham structure with a single double bond.

Cephalosporin antibiotics are of great interest in that a number of them are of value in the treatment of infections caused by a variety of gram positive and gram negative pathogenic bacteria. Additionally these antibiotics are of value in that they can be administered to penicillin hypersensitive patients. To date most cephalosporin antibiotics which have significant antibacterial activity require to be administered by injection. These antibiotics usually have a substituent in the 3-position which is either an acetoxymethyl or pyridiniummethyl group.

We have now found that cephalosporin compounds of Formula I below appear to be more resistant to metabolic processes reducing antibacterial activity than do cephalosporin compounds possessing 3-acetoxy-methyl groups, as evidenced by animal tests. Moreover certain compounds of Formula I show significant absorption after oral administration as evidenced by the level of the urinary recovery of the antibiotic following oral administration to rats. Cephalosporin antibiotics having 3-pyridiniummethyl groups are in general not well absorbed after oral administration. The compounds according to the invention show significant activity against gram-positive organisms as evidenced by in vitro tests. Compounds of Formula I are also of interest as intermediates in the preparation of other antibiotics.

According to the invention we provide compounds of the general formula

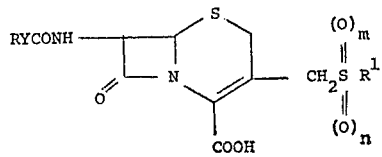

(I)

where RYCO is an acyl group of the aliphatic, heterocyclic araliphatic containing 1 or 2 hetero atoms, araliphatic or cycloaliphatic series which has an atomic weight sum of at least 120 when R is a carbocyclic aromatic group and $m=n=0$, Y is —$CH_2$— or —CO—, m and n are 0 or 1 and $R^1$ is an alkyl group having from 1 to 4 carbon atoms or such an alkyl group substituted by a carboxy, carboalkoxy or mercapto group, and non-toxic derivatives thereof e.g. base salts (where applicable) and acid addition salts (where applicable). By the term "non-toxic" as applied to the compounds of the invention we mean those derivatives which are physiologically acceptable in the dosage at which they are administered.

An important series of compounds according to the invention are the compounds having the general formula

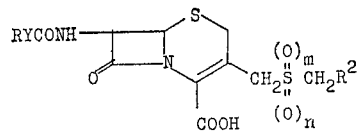

(II)

where RYCO, m and n have the above defined meanings and $R^2$ is hydrogen, carboxy or carboalkoxy ($C_2$-$C_5$) and acid addition and base salts thereof.

Another important series of compounds according to the invention are the compounds of the general Formula I wherein the acyl group, RYCO, has the formula ArCH$_2$CO were Ar is an aromatic heterocyclic group. Particularly important compounds of this class are compounds of the formula

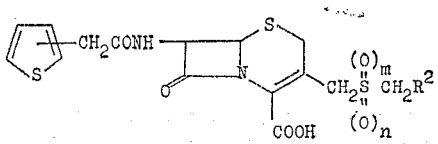

(III)

where m, n and $R^2$ have the above defined meanings, and base salts thereof.

Salts which may be formed from the compounds according to the invention include (a) inorganic base salts such as alkali metal, e.g. sodium and potassium, alkaline earth metal e.g. calcium, and organic base salts e.g. procaine and dibenzylethylene diamine salts and (b) acid addition salts e.g., with hydrochloric, hydrobromic, sulphuric, nitric, phosphoric, toluene-p-sulphonic and methane sulphonic acids. The salts may also be in the form of resinates, formed e.g., with a polystyrene resin containing amino, quaternary amino, or sulphonic acid groups, or a resin containing carboxyl groups, e.g. a polyacrylic acid resin. The resin may if desired be cross-linked, e.g.

it may be a copolymer of styrene and divinylbenzene containing the appropriate groups.

Whilst RYCO may represent an acyl group of the aliphatic, heterocyclic araliphatic containing 1 or 2 hetero atoms, araliphatic or cycloaliphatic series in general terms, one may use specific acyl radicals as defined in the following general formulae, but it should, however, be noted that this is not intended to be an exhaustive list of all the possible N-acyl groups which may be present.

(i) $R^u(CH_2)_mCO$—where $R^u$ is aryl [carbocyclic or heterocyclic—subject to the above limitation], cycloalkyl, substituted aryl, substituted cycloalkyl, and $m$ is an integer from 1 to 4. Examples of this group include substituted phenylacetyl, e.g. fluorophenylacetyl, nitrophenylacetyl, acetoxyphenylacetyl, alkanoylphenylacetyl, or hydroxyphenylacetyl, thienyl-2- and -3-acetyl and pyridylacetyl.

(ii) $C_nH_{2+1}CO$—where $n$ is an integer from 1–7. The alkyl group may be straight or branched, and if desired, may be interrupted by an oxygen or sulphur atom or substituted by e.g. a cyano group. Examples of such groups include hexanoyl, heptanoyl, octanoyl, butylthioacetyl, and cyanoacetyl.

(iii) $C_nH_{2n-1}CH_2CO$—where $n$ is an integer from 2–7. The alkenyl group may be straight or branched and, if desired, may be interrupted by an oxygen or a sulphur atom. Examples of such groups include allylthioacetyl.

(iv) $R^vO.CH_2.CO$—where $R^v$ is aryl (carbocyclic or heterocyclic), cycloalkyl, substituted aryl, substituted cycloalkyl or a non-aromatic heterocyclic group. An example of such a group is phenoxyacetyl.

(v) $R^vSCH_2.CO$—where $R^v$ is as defined above. Examples of such thio groups include S-phenylthioacetyl, S-chloro-phenylthioacetyl and S-bromo-phenylthioacetyl.

(vi) $R^v(CH_2)_nZ(CH_2)_p.CO$—where $R^v$ is an defined above, $p$ is an integer from 1–5, $n$ is an integer from 1–4, and Z is an oxygen or sulphur atom. Examples of such groups include S-benzylthioacetyl, S-benzylthiopropionyl and S-phenethylthioacetyl.

(vii) Amino acyl, other than α-aminoacyl, for example $R^wCH(NH_2).(CH_2)_nCO$ or $NH_2.Ar(CH_2)_nCO$, where $n$ is an integer from 1–10, $R^w$ is a hydrogen atom or an alkyl, aralkyl or carboxy group or a group as defined under $R^v$ above, and Ar is an arylene group, e.g. p-phenylene or 1,4-naphthylene. Examples of such groups are disclosed in British patent specification No. 1,054,806. Groups of this type disclosed by the British patent are p-aminophenylacetyl, α-aminoacetyl, α-amino-α-methylacetyl, α-amino-α-phenylacetyl, β-aminopropionyl, β-amino-β-phenylpropionyl, L-γ-amino-γ-carboxybutyryl, 11-aminoundecylyl and dl-β-amino-β-carboxypropionyl groups. Other acyl groups of this type include those e.g. 5-amino-5-carboxypentanamido derived from naturally occurring amino acids.

(viii) Glyoxylyl and substituted glyoxylyl groups of the formula $R^yCOCO$—where $R^y$ is an aliphatic, araliphatic or aromatic group, e.g., a thienyl group, a phenyl group, or a mono, di- or tri-substituted phenyl group, the substituents being, for example, one or more halogen atoms (F, Cl, Br or I), methoxy groups, methyl groups, or amino groups, or a fused benzene ring. Included in this group are also the α-carbonyl derivatives of the above glyoxylyl and substituted glyoxylyl groups formed, for example, with hydroylamine, semicarbazide, thiosemicarbazide, isoniazide or hydrazine.

When the group RYCO contains a heterocyclic aromatic substituent, the heterocyclic ring should contain no more than 2 hetero atoms and advantageously only 1 hereto atom.

The compounds according to the invention are referred to herein generically as thioether compounds and this term is to be taken as including the —S—,

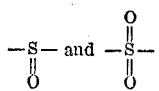

compounds except when the context is clearly with reference to the simple —S— compounds.

The thioether compounds according to the invention may be prepared by acylation of the appropriate 7β-amino-3-thioetherified methylceph-3-em-4-carboxylic acid or derivative thereof or alternatively by conversion (direct or indirect) of a 7β-acylamido-3-hydroxymethyl (or 3-acetoxymethyl)-ceph-3-em-4-carboxylic acid or derivative thereof into the desired 3-alkyl ($C_{1-4}$) thiomethyl compound. Both methods have advantages and will now be described in more detail. For convenience the methods will be described with reference to 3-alkyl ($C_{1-4}$) thiomethyl compounds although it is to be understood that the methods also apply to the other compounds of Formula I.

Acylation of 7β-amino-3-alkyl ($C_{1-4}$) thiomethylceph-3-em-4-carboxylic acids and their esters The acylation may be effected with any convenient acylation agent such as for example, an acid halide (e.g. chloride or bromide), an anhydride or mixed anhydride, e.g. with pivalic acid or formed with a haloformate, e.g. a lower alkylhaloformate, or an active ester or azide; alternatively, the acid itself can be used, together with an esterifying agent, e.g. carbonyldiimidazole or a carbodiimide such as N,N′-diethyl-, -dipropyl-, or -diisopropylcarbodiimide, or preferably N,N′ - dicyclohexylcarbodiimide.

The cephalosporin compound may be employed as the free 4-COOH compound, or as an ester with an alcohol or phenol which may readily be split off, e.g. by hydrolysis or reduction, at a later stage of the reaction, or as an acid addition salt, e.g. with nitric acid or a hydrocarbyl sulphonic acid of the free 4-COOH compound or ester thereof. Examples of hydrocarbyl sulphonic acids include alkylbenzene sulphonic acids, e.g. p-toluene sulphonic acid, and lower alkane sulphonic acids, e.g. methane sulphonic acid.

Alcohol and phenol residues which may readily be split off include those containing electron-attracting substituents for example sulpho groups and esterified carboxyl groups. These groups may be split off by alkaline reagents but care should be exercised in using these reagents not to cause $\Delta^3 \rightarrow \Delta^2$ isomerisation. Benzyl ester groups at the 4-position may be removed by hydrogenolysis although this may involve catalyst poisoning. A preferred method involves acid hydrolysis and groups which may be removed by acid hydrolysis include the adamantyl group, t-butyl and the residues of alkanols containing electron donors such as acryloxy, alkoxy, benzoyloxy, substituted benzoyloxy, halogen, alkylthio, phenyl, alkoxyphenyl or aromatic heterocyclic in the α-position. These radicals may be derived from alcohols such as p-methoxybenzyl alcohol, furfuryl alcohol, di-p-methoxy-phenylmethanol, triphenylmethanol, diphenylmethanol and benzoyloxymethanol. We particularly prefer to use compounds having inter alia a diphenylmethoxycarbonyl or p-methoxybenzyloxycarbonyl group at the 4-position because esters of this type do not appear to undergo appreciable $\Delta^3 \rightarrow \Delta^2$ isomerisation under the conditions of reaction.

Alcohol residues which may be readily split off by a reducing agent are those of a 2,2,2-trihalogenoethanol, e.g. 2,2,2-trichloroethanol. These residues may be removed by zinc/acetic acid, zinc/formic acid, zinc/lower alcohol or zinc/pyridine.

Where the ester group at the 4-position is removed by acid hydrolysis, this may be effected by using trifluoroacetic acid preferably in conjunction with anisole or alternatively by using hydrochloric acid in admixture with acetic acid.

Other ester groups at the 4-position which can readily be removed include silyl and stannyl esters.

Stannyl esters are formed with tetravalent tin moieties, and the stannylating agent conveniently has the formula $$R^9_3SnOSnR^9_3, \ R^9_3SnOH, \ R^9_3SnOCOR^9,$$
$$R^9_3SnOR^9, \ SnR^9_4, \ or \ Sn(OR^9)_4$$

where $R^9$ represents a hydrocarbon group, e.g., a lower alkyl, aryl, or aralkyl group. Tri-n-butyltin oxide is particularly preferred owing to its ready availability and low toxicity; triethyltin hydroxide is also particularly useful. Triloweralkyl tin halides, e.g., tributyltin chloride, may be reacted with an alkali metal, e.g. sodium, salt of a cephalosporanic acid to provide the required stannyl ester.

Silyl esters are formed with tetravalent silicon moieties, and the silylating agent conveniently is a silazane of the formula $$R^4_3Si.NR^4_2, \ R^4_3Si.NH.SiR^4_3, \ R^4_3Si.NH.COR^4$$
$$R^4_3Si.NH.CO.NH.SiR^4_3, \ R^4NH.CO.NR^4.SiR^4_3$$

or $$R^4C(OSiR^4_3):NSiR^4_3$$

where the various groups $R^4$, which can be the same or different, represent hydrogen atoms or alkyl, aryl, or aralkyl groups. Some of these compounds may not be particularly stable under the reaction conditions where $R^4$ is H for all $R^4$ groups. It is generally preferred that the $R^4$ groups of the silazane should be hydrocarbon groups and preferably the hydrocarbon group should be methyl or phenyl as, for example, in hexamethyldisilazane, $(Me_3Si)_2NH$. When preparing the esters on a commercial scale it may be advantageous to employ silyl chlorides such as, for example, $Me_3SiCl$, in conjunction with a weak base such as, for example, $Et_2NH$ to give silylamines for example $Me_3Si.NEt_2$. The reaction can be followed by measuring the amount of volatile amine or ammonia produced if such compounds are decomposition products. Silazanes which give rise to ammonia or volatile amines are preferred because the base is volatilised under the reaction conditions, thereby avoiding $\Delta^2$ isomerisation which might otherwise occur. An inert gas is desirably passed through the reaction mixture to entrain volatile products and keep out moisture.

Silanes such as $R^4_3SiH$ where $R^4$ has the above-given meaning are not particularly suitable in this process since in general they are too reactive. Where the silylating agent is a halide, e.g., $Me_3SiCl$, causing formation of hydrogen halide during silylation, a weak base, e.g. pyridine, is desirably used as acid acceptor. Strong bases may cause isomerisation of the cephalosporin derivative to the corresponding $\Delta^2$ compound.

At least 1 mole of organosilicon compound, is used, and an excess of up to 3 moles, is used to effect silylation. Undiluted organosilicon compounds may be employed as the reaction medium for the silylation or an inert diluent such as a hydrocarbon e.g. benzene, toluene or a xylene, or a halogenated hydrocarbon e.g. chloroform or methylene chloride may be used.

The silyl or stannyl ester group is easily split by exposing the derivative to an excess of a compound(s) containing active hydrogen, e.g., water, acidified or basified water, alcohols or phenols.

The acylation may be carried out in an aqueous medium, with an acid halide, for example in an aqueous solution of a water-miscible ketone such as acetone, or in an aqueous solution of tetrahydrofuran, preferably also in the presence of an acid binding agent for example sodium bicarbonate. The pH is preferably maintained at from 5 to 7 during the reaction which may be carried out at temperatures of from 0 to 25° C. The acylation may also be carried out in an organic solvent medium such as ethyl acetate by, for example, simple refluxing.

Alternatively the acylation may be effected with an acid halide or mixed anhydride under substantially anhydrous conditions in the liquid phase in an inert Lewis base (preferably one having a tertiary nitrogen atom) having a dielectric constant above 15 and preferably above 30 and containing a hydrogen halide acceptor. The dielectric constant of the base is advantageously within the range of 30–40 and the base is preferably N,N-dimethylacetamide or N,N-dimethtylformamide. The reaction may be carried out on the free 4—COOH compound, on an ester thereof or on an acid addition salt e.g. the hydrogen p-toluene-sulphonate of the 4—COOH compound or ester thereof. One may employ an acid addition salt of said ester under the aforesaid anhydrous conditions since this derivative can be obtained in high yield from the N-deacylation step (see below). Thereafter, if desired, the ester group is removed. The acid halide is advantageously the chloride or bromide.

Methods of effecting acylation under substantially anhydrous conditions are described more fully in British patent specification No. 1,104,937.

Preparation of 7β-amino-3-alkyl ($C_{1-4}$) thiomethylceph-3-em-4-carbboxylic acids (A) and 7β-acylamido-3-alkyl ($C_{1-4}$) thiomethylceph-3-em-4-carboxylic acids (B)

Compounds (A) are required as starting materials in the acylation step described above and this preparation is conveniently described with that of compounds (B).

The 3-alkyl ($C_{1-4}$) thiomethyl compounds may be prepared from the corresponding 3-acetoxymethyl compounds.

(a) Direct displacement of acetoxy group in 3-acetoxymethyl by a $SR^1$ group

One method for preparing the thioether compounds according to the invention comprises reacting the corresponding 3-acetoxymethyl compound in a polar medium with the appropriate thiol so as to displace the acetoxy group and then recovering the desired 3-alkyl ($C_{1-4}$) thiomethyl compound.

The reaction may conveniently be effected by maintaining the reactants in solution at a temperature such as for example, 15–100° C. until the desired derivative is obtained in optimum yield. The reactants are advantageously employed in a ratio of about 1 molar equivalent of the 3-acetoxymethyl compound to 1–10 molar equivalents of the thiol. The pH value of the reaction solution is advantageously maintained within the limits 5.0–8, preferably 6–7.

Since the reaction appears to proceed by a polar or ionic mechanism it is necessary to employ a polar medium for the reaction to proceed at a measurable rate. Although water may be used as the polar medium it may act as a competitive nucleophile and one may use the thiol itself as the solvent. If the thiol is solid or liquid at the reaction temperature it may be used in association with a polar solvent, e.g. water. If the thiol is volatile or gaseous at the reaction temperature as in the case of, for example, methane thiol or ethane thiol improved yields may be obtained by carrying out the reaction under pressure, for example by heating the components in a sealed tube or autoclave, if desired in association with an added polar solvent.

Preferred thiols are the lower alkane thiols and a particularly preferred lower alkane thiol is methane thiol.

The reaction product may be separated from the reaction mixture, which may contain, for example, unchanged cephalosporin and other substances, by a variety of processes including crystallisation, counter current separation ionophoresis, paper chromatography, thin layer chromatography, or by chromatography on ion-exchange resins.

Indirect preparation of thioethers

Alternatively, thioetherification can be effected indirectly by first converting the 3-hydroxymethyl compound to a compound having at the 3-position the group —$CH_2X$ such that the acid HX has a pKa of not more than 4.0, and preferably not more than 3.5 (as measured in water at 25° C.) and reacting the resulting 3-$XCH_2$-ceph-3-em- 4-carboxylic acid or ester (see below where X-halogen) with a thiol so that the thiol residue replaces the group X and the desired 3-alkyl($C_{1-4}$)thiomethyl compound or its 4-ester is obtained.

The indirect reaction may be depicted as follows, taking for illustrative purposes only the preparation of 3-methylthiomethyl - 7β-(2′-ethienylacetamido) - ceph-3-em-4-carboxylic acid starting from the known compound 3-hydroxymethyl-7β-(2′-thienylacetamido) - ceph-3-em-4-carboxylic acid:

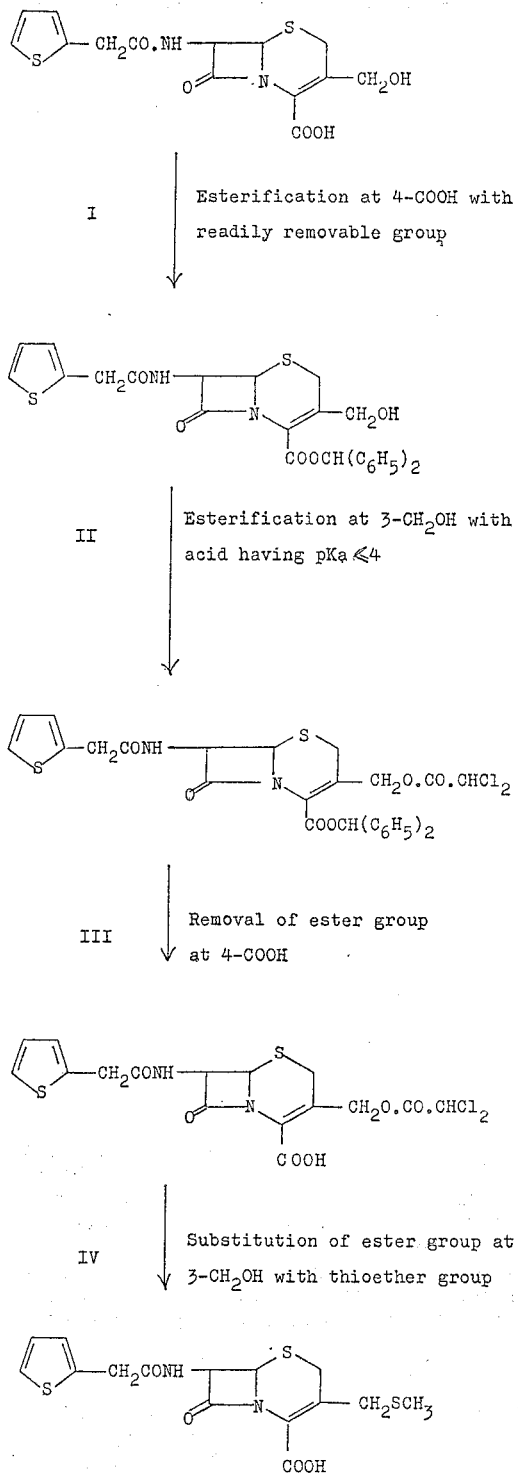

In Step (I) the 7β-acylamido-3-hydroxymethylceph-3-em-4-carboxylic acid compound is first esterified with a group which is readily removable when desired. This may conveniently be achieved by reaction with diphenyldiazomethane. It should be noted when substituting some X groups by a thioether group, that a 4-ester group is essential at that stage but when substituting other X groups by a thioether group the presence of a 4-ester group is undesirable at that stage; this is explained in more detail below.

In Step (II) the resulting 7β-acylamido-3-hydroxymethyl-ceph-3-em-4-carboxylic acid ester is acylated with dichloroacetyl chloride to yield the desired 7β-acylamido-3-$CH_2O \cdot CO \cdot CHCl_2$-ceph-3-em-4-carboxylic acid ester.

After removal of the ester group to the 4-COOH group, e.g. in the case of diphenylmethyl by trifluoroacetic acid in conjunction with anisole in Step (III), the 3-$CH_2O \cdot CO \cdot CHCl_2$ group is reacted in Step (IV) with the chosen thiol in a polar medium to yield a 3-alkyl ($C_{1-4}$)thiomethyl compound. If at this stage the 7β-acylamido group is not the group of choice this may be removed, e.g. as described below, and the resulting 7β-amino compound reacylated.

Preferred thiols are the lower alkane thiols and a particularly preferred lower alkane thiol is methane thiol.

The group X is preferably one of two main types depending on whether a halogen atom or an oxygen atom is directly attached to the 3-methylene group, these two types of group will be discussed in turn under the respective headings: halogens; oxygen leaving-groups. The selected acid HX should be chosen so that it has a pKa of not more than 4.0.

Halogens (X=Cl, Br, or I)

When X represents certain halogen atoms, particularly iodine, the 4-carboxy group may be esterified. Since esters are generally without substantial antibiotic activity, and moreover since the corresponding isomeric ceph-2-em-4-carboxylic acids are also generally without substantial antibiotic activity, it is desirable to use as esterifying group a group which can be readily introduced and removed without appreciable $\Delta^3 \rightarrow \Delta^2$ isomerisation (which is known to be likely to occur in such reactions). Preferred esterifying groups include the diphenylmethyl, 2,2,2 - trichloroethyl and t-butyl groups; the diphenylmethyl group can be readily introduced by means of diphenyldiazomethane, and removed by means of a mixture of trifluoroacetic acid and anisole at room temperature whilst the 2,2,2-trichloroethyl group may be split off by an agent such as zinc/acetic acid, zinc/formic acid, zinc/lower alcohol or zinc/pyridine.

The 3—$CH_2X$ compounds, where X represents Cl or Br, can be prepared from the corresponding 3—$CH_2OH$ compounds, the 4—COOH group being esterified, by standard methods for the replacement of —OH by Cl or Br. For example, the 3—$CH_2Cl$ compounds can be prepared from the corresponding 3—$CH_2OH$ compounds by reaction with thionyl chloride or acid chlorides such as N,N-dialkyl chlorosulphinamides, e.g. N,N-dimethylchlorosulphinamide, or N,N-diaryl chlorosulphinamides.

The 3—$CH_2Br$ compounds may be similarly prepared by reaction of the corresponding bromo-compounds with the 3—$CH_2OH$ compounds or by reaction of the latter with $PBr_3$ and pyridine. The 3—$CH_2I$ compounds can be prepared from the corresponding chlorides and bromides e.g. by reaction with an alkali metal iodide.

The 3—$CH_2OH$ compounds can be prepared for example by hydrolysis of the corresponding

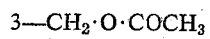

compounds. The hydrolysis may be effected enzymatically, using, for example, wheat germ esterase or an esterase of the genus Rhizobium, as described in Belgian patent specification No. 671,692, or an esterase derived from orange peel, as described in British patent specification No. 966,222.

Oxygen leaving-groups

Another class of starting materials useful in the process according to the invention has the partial formula

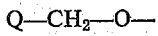

(where Q is the remainder of the cephalosporin molecule). This class includes esters of acetic acid derivatives having at least one electron-withdrawing substituent on the α-carbon atom, and esters of nuclear substituted benzoic acids, the nuclear substituent also being of the electron-withdrawing type. Thus the acid HX may be any of the various haloacetic acids (dichloroacetic acid being particularly preferred), methoxy-, alkylthio-, or cyanoacetic acid, glyoxylic acid, phenylpropiolic acid, a hemiester of malonic or oxalic acid, phenylglyoxylic acid, or a substituted phenylglyoxylic acid, the substituent(s) being for example one or more halogen atoms (F, Cl, Br, or I), methoxy groups or methyl groups. When the acid HX is a substituted benzoic acid, the choice of the substituent in the benzene ring will be influenced to some extent by a consideration of the stereochemistry of the benzoic acid HX. In general we prefer the phenyl group to be substituted in the 3- or 4- position rather than the 2-position since substitution at the 2-position gives rise to the maximum steric hindrance. Thus possible substituents include, for example, 4-methyl, 3- chloro or bromo, 3-, or 4- nitro or 3,5-dinitro, 3-, or 4-trifluoromethyl, 4-carbamoyl, 3-, or 4-(esterified carboxyl), or 3-, or 4-cyano.

The acid HX may also be formic acid.

When the group X contains a reactive centre, e.g. an active chlorine atom as in a dichloroacetoxy group, the incoming nucleophile may attack at this centre also. Under such circumstances, it is desirable to use a corresponding excess of the incoming nucleophile, e.g. two equivalents excess when dichloroacetoxy is displaced.

The starting materials having the partial formula

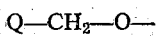

(where Q is as hereinbefore defined) are conveniently prepared by acylation of a cephalosporanic acid derivative having a 3-hydroxymethyl group. The acylating agent is preferably a reactive derivative of an acid such as a keten (where this exists), an acid halide, e.g. a chloride or bromide, an anhydride or mixed anhydride, e.g. with pivalic acid or formed with a haloformate, or an active ester or azide; alternatively, the acid itself can be used, together with an esterifying agent, e.g. carbonyl-diimidazole or a carbodiimide such as N,N'-diethyl-, dipropyl-, or -diisopropyl-carbodiimide, or preferably N,N'-dicyclohexyl-carbodiimide.

The acylation should be effected under such conditions that both lactone formation and $\Delta^3 \rightarrow \Delta^2$ isomerisation are substantially avoided. Lactone formation can be reduced by esterification of the 4-carboxy group before acylation. The esterifying group should be readily introducible and removable without resulting in $\Delta^3 \rightarrow \Delta^2$ isomerisation. As mentioned above preferred protecting groups are the diphenylmethyl group and the 2,2,2-trichloroethyl group which can be readily introduced and removed (after acylation of the 3—$CH_2OH$ group) substantially without $\Delta^3 \rightarrow \Delta^2$ isomerisation.

The esterifying group is preferably removed before the cephalosporin is reacted with the incoming nucleophile.

Reaction conditions for the substitution of X by a thioether group

The reaction may conveniently be effected by maintaining the reactants in solution at a moderate temperature, e.g., 0–120° C., preferably 35–75° C., advantageously about 50° C. Reactions are usually complete (in aqueous solvents) in about 2 hours at 60°, and in correspondingly longer times at lower temperatures or correspondingly shorter times at higher temperatures. The reaction is advantageously effected using from one molar equivalent to ten molar equivalents of incoming nucleophile. The pH value of the reaction solution under aqueous conditions is advantageously maintained within the limits 5–8, preferably 6–7. If necessary the pH of the solution should be adjusted to the desired value by the addition of a buffering agent such as sodium acetate. When working under non-aqueous conditions, the reaction medium should be neither extremely basic nor extremely acidic.

When the cephalosporin starting material is in the free acid form it is desirable to employ a polar medium for the reaction to proceed. The most generally suitable is water but organic solvents such as formamide, dimethylformamide or acetone may be employed. The organic solvents may be used in the presence or absence of water.

Where essentially non-aqueous conditions are used the thiol may itself be used as the reaction medium.

Non-polar solvents may also be used, in which cases the addition of as little as 0.5% of water will often bring about the desired amount of polarity.

Organic media which may be used include lower alkanoic acid nitriles e.g. acetonitrile or propionitrile; halogenated hydrocarbons e.g. methylene chloride, carbon tetrachloride, chloroform, ethylene dichloride or perchloroethylene; lower nitroalkanes, e.g. nitromethane; nitro-aromatic compounds, e.g. nitrobenzene; cyclic ethers e.g. dioxan or tetrahydrofuran; amides of the general formula $R^5 \cdot CO \cdot NR^6 \cdot R^7$ where $R^5$ is a hydrogen atom or an alkyl group containing 1 to 5 carbon atoms and $R^6$ and $R^7$, which may be the same or different, are each a hydrogen atom or an alkyl group containing 1 to 5 carbon atoms, or, alternatively $R^6$ and $R^7$ together form a divalent aliphatic group which, together with the adjacent nitrogen atom, forms a heterocyclic ring. Examples of amides of this type are N,N-dimethylformamide, N,N-diethylformamide, N,N-dimethylacetamide, formamide and N-methylformamide. Other solvents which may be used include N-lower alkyl pyrrolidones e.g. N-methylpyrrolidone and di-lower alkyl sulphoxides, e.g. dimethylsulphoxide.

The reaction medium need not be liquid at room temperature. Solids, e.g. acetamide may be used so long as they are liquid at the reaction temperature.

The reaction product may be separated from the reaction mixture, which may contain, for example, unchanged cephalosporin and other substances, by a variety of processes including recrystallization, ionophoresis, counter current separation, paper chromatography, thin layer chromatography or by chromatography on ion-exchange resins.

The replacement of X by the incoming thiol may require the assistance of a salt of mercury, silver, or gold, preferably mercury. The reaction conditions are generally as set out in British patent specification No. 1,101,424.

N-deacylation followed by reacylation

Where the final product is a 7β-acylamido compound not having the desired acyl group, the 7β-acylamido compound may be N-deacylated to yield the corresponding 7β-amino compound and the latter acylated with an appropriate acylating reagent.

Methods of N-deacylating cephalosporin C derivatives having 7β-acylamido groups are known and one suitable method comprises treating a 7β-acylamido-3-alkyl ($C_{1-4}$) thiomethyl ceph - 3-em-4-carboxylic acid ester with an imide-halide forming component, converting the imide halide so obtained into the imino ether and decomposing the latter e.g. by hydrolysis or alcoholysis. If desired, the ester group, if still intact, may be split off by hydrolysis or hydrogenolysis to yield the 4-carboxylic acid. Suitable readily removable ester groups are described above. The 7β-acylamido group may be 5-amino-5-carboxypentanamido or a group derived therefrom by acylation and/or esterification thereof; for example, the $NH_2$ group may be acylated with benzoyl chloride to form a benzamido group and/or the COOH group may be esterified with a silylating derivative as described above.

Suitable imide halide forming components include acid halides derived from the phosphorus acids, the preferred compounds being the chlorides such as, for example, phosphorus oxychloride or phosphorus pentachloride.

The reaction with the imide halide forming component may be carried out in the presence of an organic or inorganic base. Suitable organic bases include tertiary amines such as, for example, pyridine or dimethylaniline while calcium carbonate is an example of a suitable inorganic base.

The imide halide forming component may, if desired, be added to the 4-ester of the 7β - acylamido - 3-alkyl ($C_{1-4}$) thio methyl-ceph - 3-em-4-carboxylic acid in the form of a solution. Preferably the solution should be in an inert organic solvent such as a chlorinated hydrocarbon e.g. methyelne chloride.

The imide halide may be converted into the imino ether by reacting with an alcohol, preferably a lower alkanol, in the presence of a tertiary amine as described above, and the imino ether may be decomposed by using water or a lower alkanol e.g. methanol, in the presence of a basic or acidic catalyst. Acidic catalysts which may be used include mineral and organic acids such as hydrochloric acid, phosphoric acid, trifluoroacetic acid and p-toluenesulphonic acid. Suitable basic catalysts include ammonia and salts of weak acids with an alkali metal or alkaline earth metal.

This method of N-deacylation is described in greater detail in Belgian Pat. No. 719,712.

N-deacylation of a 7β-acylamido-3-alkyl($C_{1-4}$) thio methyl-ceph-3-em-4-carboxylic acid or derivative thereof may also be effected by direct acid hydrolysis e.g. with 0.1 N to N hydrochloric acid.

When the substituent at the 7β-amino group is a 5-amino-5-carboxypentanamido group the N-deacylation may be effected by the action of nitrosyl chloride as described in British Pat. No. 1,017,534.

Where the starting compound is a 7β-amino compound, it may be necessary to protect the 7β-amino group during the various reaction steps. This can be done as described above, by acylation or alternatively, by means of another readily removable group which can be removed at a convenient point.

The sulphonyl compounds, according to the invention, may be prepared by any of the methods discussed above in relation to the thioether compounds viz by acylation of the appropriate 7β-amino compound or by direct or indirect conversion of the appropriate 7β-acylamido-3-hydroxymethyl (or 3 - acetoxymethyl)-ceph-3-em-4-carboxylic acid or derivative thereof into the 3-sulphonyl compound. In the nucleophilic reactions the nucleophile is the sulphinate anion derived from sulphinic acid, $R^1SO_2H$, or a salt thereof. In such reactions the pH is advantageously between 3 and 6. The sulphoxide compounds, according to the invention, may be prepared by acylation of the appropriate 7β-amino compound or by selective oxidation of a 3-thio-etherified compound, e.g. using chromic oxide, dibenzoyl peroxide, sodium periodate, or peracetic acid, or by nucleophilic displacement, the nucleophile being the sulphenate anion derived from sulphenic acid, $R^1SOH$, or a salt thereof. The sulphonyl compounds may, if desired, be obtained from the sulphoxide compounds by oxidation.

The compounds according to the invention may be formulated for administration in any convenient way, by analogy with other antibiotics and the invention therefore includes within its scope a pharmaceutical composition comprising a compound of Formula I or a non-toxic derivative e.g. salt thereof (as herein defined) adapted for use in human or veterinary medicine. Such compositions may be presented for use in conventional manner with the aid of any necessary pharmaceutical carriers or excipients.

The invention therefore provides pharmaceutical compositions comprising a compound of Formula I or non-toxic derivative thereof (as herein defined) in association with a pharmaceutical carrier or excipient. The compositions are preferably presented in a form suitable for absorption by the gastro-intestinal tract. Tablets and capsules for oral administration may be in unit dose presentation form, and may contain conventional excipients such as binding agents, for example, syrup, acacia, gelatin, sorbitol, tragacanth, or polyvinylpyrrolidone; fillers, for example lactose, sugar, maize-starch, calcium phosphate, sorbitol or glycine; lubricants, for example, magnesium stearate, talc, polyethylene glycol, silica; disintegrants, for example, potato starch or acceptable wetting agents such as sodium lauryl sulphate. The tablets my be coated according to methods well known in the art. Oral liquid preparations may be in the form of aqueous or oily suspensions, solutions, emulsions, syrups, elixirs, etc. or may be presented as a dry product, for reconstitution with water or other suitable vehicle before use. Such liquid preparations may contain conventional additives such as suspending agents, for example, sorbitol syrup, methyl cellulose, glucose/sugar syrup, gelatin, hydroxyethylcellulose, carboxymethyl cellulose, aluminium stearate gel or hydrogenated edible fats; emulsifying agents, for example, lecithin, sorbitan mono-oleate or acacia; non-aqueous vehicles which may include edible oils, for example, almond oil, fractionated coconut oil, oil esters, propylene glycol, or ethyl alchol; preservatives, for example, methyl or propyl p-hydroxy-benzoates or sorbic acid. Suppositories will contain conventional suppository bases, e.g. cocoa butter or other glyceride.

Compositions for injection may be presented in unit dose form in ampoules, or in multidose containers with an added preservative. The compositions may take such forms as suspensions, solutions, emulsions in oily or aqueous vehicles, and may contain formulatory agents such as suspending, stabilising and/or dispersing agents. Alternatively the active ingredient may be in powder form for reconstitution with a suitable vehicle, e.g. sterile, pyrogen-free water, before use.

The compositions may also be prepared in suitable forms for absorption through the mucous membranes of the nose and throat or bronchial tissues and may conveniently take the form of powder or liquid sprays or inhalants, lozenges, throat paints etc. For medication of the eyes or ears, the preparations may be presented as individual capsules, in liquid or semi-solid form, or may be used as drops etc. Topical applications may be formulated in hydrophobic or hydrophilic bases as ointments, creams, lotions, paints, powders etc.

For veterinary medicine the composition, may, for example, be formulated as an intramammary preparation in either long acting or quick-release bases.

The compositions may contain from 0.1% upwards, preferably from 10–60% of the active material, depending on the method of administration. Where the compositions comprise dosage units, each unit will preferably contain 50–500 mg. of the active ingredient. The dosage as employed for adult human treatment will preferably range from 100–3000 mg. for instance 1500 mg. per day, depending on the route and frequency of administration.

The compounds according to the invention may be administered in combination with other therapeutic agents such as antibiotics, for example other cephalosporins, the penicillins or tetracyclines.

In order that the invention may be well understood the following examples are given by way of illustration only. In the examples:

N.M.R. spectra were obtained at 60 mHz.

Paper electrophoreses were carried out on Whatman No. 3 MM paper at pH 1.9 (98% formic acid (16.7 ml.), glacial acetic acid (84 ml.), acetone (105 ml.) and water (495 ml.)) at a potential of 15–20 volts/cm.

The solvent systems utilized in the paper chromatography examinations are as follows:

System 1 ethyl acetate: n-butanol: 0.1 M-sodium acetate (pH 5.0)=8:1:8, run downwards with the upper phase (in equilibrium with lower phase) as developing solvent, at 38° C. on Whatman No. 1 paper buffered to pH 5.0.

System 2: n-propanol: water=7:3, run downwards at room temperature on Whatman No. 1 paper.

System 3: comprises the upper phase of the system described below for thin-layer chromatography, run downwards on Whatman 3MM paper buffered to pH 6 with 0.05 M-sodium dihydrogen phosphate brought to pH 6 with phosphoric acid.

Thin-layer chromatography (TLC) was carried out with layers of silica gel, with a solvent comprising the upper phase of the system n-butanol:ethanol:water=4:1:5.

Chromatographic papers and plates were examined under ultraviolet light for absorbing and fluorescing spots.

The signs of the J values are not given. "Petroleum spirit" is the fraction, B.P. 40–60°.

Reaction mixtures were dried over dried magnesium sulphate and evaporated at 40° C. at approx. 20 mm. Hg, unless otherwise stated.

EXAMPLE 1

3-ethylthiomethyl-7β-(2'-thienylacetamido)-ceph-3-em-4-carboxylic acid

3 - acetoxymethyl - 7β - (2' - thienylacetamido)-ceph-3-em-4-carboxylic acid (8.0 g.) was dissolved in water (25 ml.) containing sodium bicarbonate (1.68 g.); ethanethiol (7.4 ml., 5 equiv.) was added in acetone (25 ml.) and the mixture reacted in a sealed 200 ml. glass tube at 37° for 7 days. The excess thiol and acetone were distilled off under reduced pressure into a trap containing acidified potassium permanganate and the aqueous residue diluted with sodium bicarbonate solution (2%, 100 ml.) and thoroughly washed with ethyl acetate (3× 100 ml.). After acidification the product was extracted into ethyl acetate (3× 100 ml.), washed with water (3× 50 ml.) dried and distilled to dryness under reduced pressure to give a crude solid (7.3 g.).

This material was dissolved in ethyl acetate (300 ml.) and subjected to a diamond pattern extraction of 100 transfers as described by Bush and Densen (Anal. Chem. 1948 20 121) using 300 ml. phases of ethyl acetate and pH 5 sodium phosphate buffer. The product was contained in the first seven ethyl acetate fractions:

1. 2.180g. $\lambda_{max}$. 234 nm $E_{1cm}^{1\%}$=291.$\lambda_{inf}$. 255-260 nm $E_{1cm}^{1\%}$ =111 $\lambda_{max}$. 334 nm $E_{1cm}^{1\%}$=202, equiv. weight ≫ 500.

2. 0.503g. $\lambda_{max}$. 234 nm $E_{1cm}^{1\%}$=321. $\lambda_{inf}$. 255-260 nm $E_{1cm}^{1\%}$ =181 $\lambda_{max}$. 334 nm $E_{1cm}^{1\%}$ =157, equiv. weight 425

3. 0.611g. $\lambda_{max}$. 236 nm $E_{1cm}^{1\%}$=311. $\lambda_{inf}$. 255-260 nm $E_{1cm}^{1\%}$ =204 $\lambda_{max}$. 334 nm $E_{1cm}^{1\%}$=65, equiv. weight 426.

4-7. 0.787g. $\lambda_{max}$. 234 nm $E_{1cm}^{1\%}$=277. $\lambda_{inf}$. 258-266 nm $E_{1cm}^{1\%}$ =180 $\lambda_{max}$. 330 nm $E_{1cm}^{1\%}$=23 equiv. weight 427.

Fractions 3-7 were bulked (1.248 g.) in ethyl acetate (100 ml.) and extracted with sodium bicarbonate solution (2× 100 ml. 8%). On acidification of the alkaline solution the product was extracted into ethyl acetate (3× 80 ml.), washed with water (3× 50 ml.), dried and distilled to dryness under reduced pressure.

The title compound was obtained as a white crystalline solid. Yield 0.987 g. (12.3%)

$\lambda_{max}$. 235 nm $E_{1cm}^{1\%}$=327. $\lambda_{inf}$. 260 nm $E_{1cm}^{1\%}$=230. $\lambda_{max}$. 330 nm $E_{1cm}^{1\%}$=18.

Equivalent weight found 395 ($C_{16}H_{18}N_2O_4S_5$ requires 398).

EXAMPLE 2

7β-benzyl-thiomethylcarbonamido-3-n-propylthiomethyl-ceph-3-em-4-carboxylic acid 3 - acetoxymethyl - 7β - benzylthiomethylcarbonamido-ceph-3-em-4-carboxylic acid (5.6 g.) was dissolved in water (20 ml.) and acetone (20 ml.) containing sodium bicarbonate (1.08 g.); propanethiol (3.0 ml.) was added and the mixture was heated to 37° for 7 days in a sealed tube.

The acetone and propane thiol were distilled into a trap of potassium permanganate solution under reduced pressure, the residual aqueous solution diluted with sodium bicarbonate solution (8%, 20 ml.), washed with ethyl acetate (3× 50 ml.) and acidified to pH 1. Extraction with ethyl acetate afforded a crude solid (4.6 g.).

The crude soild was purified by three successive diamond pattern counter-current extractions as described in Example 1 using ethyl acetate and 0.5 M phosphate buffer solutions at pH 5.0, 5.5 and 6.5. The combined product was bulked and triturated with cyclohexane to leave crystals of 7β-benzylthiomethylcarbonamido-3-n-propylthiomethylceph-3-em-4-carboxylic acid. Yield 0.40 g. (6.9%)

$\lambda_{max}$. 266nm $E_{1cm}^{1\%}$=230 (sodium salt 0.004%)

Equivalent weight found 462 ($C_{20}H_{24}N_2O_4S_3$ requires 452).

EXAMPLE 3

3-n-propylthiomethyl-7β-(2'-thienylacetamido)-ceph-3-em-4-carboxylic acid

In a manner analogous to that described in Examples 1 and 2 the title compound was obtained in 19.5% yield.

$\lambda_{max}$. 235nm $E_{1cm}^{1\%}$=278

$\lambda_{inf}$ 260nm $E_{1cm}^{1\%}$=176

Equivalent weight 416 (required; 412).

EXAMPLE 4

Alternative preparation of 3-n-propylthiomethyl-7β-(2'-thienylacetamido)-ceph-3-em-4-carboxylic acid The title compound was prepared via the following reaction scheme (the steps are described in more detail below).

3 - hydroxylmethyl - 7β-(2'-thienylacetamido)-ceph-3-em-4-carboxylic acid

↓ (a)

Diphenylmethyl 3 - dichloroacetoxymethyl-7β-(2'-thienylacetamido)-ceph-3-em-4-carboxylate ↓ (b)

3 - dichloroacetoxymethyl-7β-(2'-thienylacetamido)-ceph-3-em-4-carboxylic acid

↓ (c)

3 - n-propylthiomethyl - 7β-(2'-thienylacetamido)-ceph-3-em-4-carboxylic acid.

(a) diphenylmethyl 3-dichloroacetoxymethyl-7β-(2'-thienylacetamido)ceph-3-em-4-carboxylate Diphenylmethyl 3 - hydroxymethyl-7β-(2'-thienylacetamido)ceph-3-em-4-carboxylate (2.08 g., 4 mmole.), prepared by reacting 3-hydroxymethyl-7β-(2'-thienylacetamido)ceph-3-em-4-carboxylic acid with diphenydiazomethane, and pyridine (1.58 ml.; 20 mmole) were dissolved in dry tetrahydrofuran (100 ml.) and cooled to −20°. Dichloroacetyl chloride (2.95 g.; 1.96 ml.; 20 mmole.) in dry tetrahydrofuran (5 ml.) was added dropwise. 15 minutes after the addition the mixture was filtered and evaporated, and the residue was partitioned between ethyl acetate and sodium bicarbonate solution. The organic layer was washed with brine, dried and taken to small volume; this solution was then added dropwise to petrol to give a white solid (2.1 g.; 85%), M.P.>60° (softens), [α]$_D^{23}$=+17.5° (c. 1.14, dioxan), λλ$_{max}$. (ethanol) 236 nm. (ε=13,300), 259 nm. (ε=7,600), ν$_{max}$. (CHBr$_3$) 1783 (β-lactam), 1760 (CO$_2$CHCl$_2$), 1725 (COOR), 1680 and 1510 cm.$^{-1}$ (CONH). N.M.R. spectrum (CDCl$_3$) —COCHCl$_2$ 4.13τ, R$_F$=0.37 (kieselgel G plate; benzene:ethyl acetate=5:1).

(b) 3-dichloroacetoxylmethyl-7β-(2′-thienylacetamido)-ceph-3-em-4-carboxylic acid Diphenymethyl 3 - dichloroacetoxymethyl-7β-(2′-thienylacetamido)ceph-3-em-4-carboxylate (6.8 g.) was dissolved in anisole (5 ml.), and trifluoroacetic acid (15 ml.) was added. After 4 minutes the solvent was removed at 30°. The residue was dissolved in ethyl acetate and re-evaporated; the gum was redissolved in ethyl acetate (10 ml.) and added dropwise, with stirring, to petroleum ether (400 ml.). The product was obtained as a yellow solid, M.P. >60° (softens; decomp. at 99°) (4.92 g.; 95%), $[\alpha]_D^{27}=+56°$ (c., 0.7; dioxan), $\lambda\lambda_{max.}$ (ethanol) 237 nm. ($\epsilon=12,500$), 259 nm. ($\epsilon=7,500$), $\nu_{max.}$ (CHBr$_3$) 3390 (NH), 1788 (β-lactam), 1760 (COOR), 1685 and 1518 (CONH), 1735 and 1715 cm.$^{-1}$ (COOH). N.M.R. spectrum (CDCl$_3$) —O.COCHCl$_2$ 4.0τ.

The dicyclohexylamine salt crystallised from acetone, M.P. >100° (often; decomp. at 210°), $[\alpha]_D^{25}=+36°$ (c. 1.0, chloroform), $\lambda\lambda_{max.}$ (ethanol) 235 nm. ($\epsilon=13,600$), 265 nm. ($\epsilon=6,950$), $\nu_{max.}$ (CHBr$_3$) 1774 (β-lactam), 1765 (COOR), 1635 (COO$^-$), 1680 and 1518 (CONH), 812 cm.$^{-1}$ (CHCl$_2$). N.M.R. spectrum (CDCl$_3$) —CH$_2$.O.COCHCl$_2$ 3.91τ. (Found C, 52.0; H, 5.7; N, 6.3; Cl, 14.2. C$_{16}$H$_{14}$Cl$_2$N$_2$O$_6$S$_2$. (C$_6$H$_{11}$)$_2$NH requires C, 52.0; H, 5.8; N, 6.5; Cl, 14.8%).

(c) 3-n-propylthiomethyl-7β-(2′-thienylacetamido)-ceph-3-em-4-carboxylic acid A solution of 3-dichloroacetoxymethyl-7β-(2′-thienylacetamido)-ceph-3-em-4-carboxylic acid (2.33 g., 5.0 mmole) in acetone (20 ml.) was treated with n-propanethiol (3 ml. 2.54 g., 33 mmole) in acetone (30 ml.). Water (20 ml.) was added and the solution was maintained at 50° C. for one hour. The acetone and excess n-propanethiol were removed by distillation, and the mixture was partitioned between sodium bicarbonate solution and ethyl acetate. The aqueous layer was acidified with dilute hydrochloric acid to pH 2.5, and extracted into ethyl acetate. The organic layer was then re-extracted into sodium bicarbonate, washed with ethyl acetate, acidified to pH 2.5, and extracted into ethyl acetate, which was washed successively with water and brine, dried, and evaporated to 20 ml. This solution was treated with ether (60 ml.), filtered, decoloured with charcoal, and added dropwise into light petroleum to give the title compound (595 mg., 27% yield), M.P. 138–140° C. (decomp.), $[\alpha]_D+51.4$ (c. 0.77, tetrahydrofuran), $\lambda_{max.}$ (ethanol) 260 nm. ($\epsilon=8,450$), 236 nm. ($\epsilon=13,200$), $\nu_{max.}$ (bromoform) 1780 (β-lactam), 1735 (CO$_2$H), and 1682 and 1515 cm.$^{-1}$ (—CONH), N.M.R. (deuterochloroform) τ 7.52 (2-proton triplet (—S—CH$_2$Et), 9.08 (3-proton triplet)

$$(-SCH_2-CH_2-CH_3)$$

R$_F$ 0.79 (system 1) (Found: C, 49.5; H, 4.9; N, 6.5; S, 22.7. C$_{17}$H$_{20}$N$_2$O$_4$S$_3$ requires C, 49.6; H, 4.8; N, 6.8; S, 23.2%).

EXAMPLE 5

3-methylthiomethyl-7β-(2′-thienylacetamido)ceph-3-em-4-carboxylic acid

Sodium 3 - acetoxymethyl - 7β-(2′-thienylacetamido)-ceph-3-em-4-carboxylate (8.36 g., 0.02 mole) was dissolved in water (100 ml.) and treated with methanethiol (2.88 g., 0.06 mole) in a sealed-glass tube at 70° for 2 hr. The contents of the tube were transferred to an open vessel and stirred at room temperature for 15 min. to allow the excess thiol to evaporate. The solution was covered with ethyl acetate (100 ml.) and the pH of the aqueous layer adjusted to 1. The ethyl acetate layer was collected and combined with further ethyl acetate extracts (2× 100 ml.) of the aqueous layer. The combined extract was washed with water (100 ml.) and brine (100 ml.) dried (magnesium sulphate), and the solvent evaporated, leaving the crude product as a brown gum (7.30 g.). This was dissolved in acetone (40 ml.) and 10% (w./v.) sodium 2-ethylhexanoate in acetone (40 ml.) was added. Addition of ether (160 ml.) caused the precipitation of a colourless solid. After refrigeration for 1 hr. this solid was collected by filtration, washed with ether, and dried giving a powder (4.77 g.) which appeared from its proton magnetic resonance spectrum to be sodium 3-methylthiomethyl - 7β-(2′-thienylacetamido)ceph-3-em-4-carboxylate contaminated with ca. 20% of sodium 3-acetoxymethyl - 7β-(2′-thienylacetamido)-ceph-3-em-4-carboxylate. The presence of starting material was also indicated by paper chromatography (system 1) in which the product has R$_F$ 0.30, while the starting material has R$_F$ 0.15. This mixture of sodium salts (4.66 g.) was dissolved in water (50 ml.), the solution covered with ethyl acetate (50 ml.) and the pH lowered to 1. The acidic material was recovered as a colourless foam (4.30 g.). This foam was dissolved in ethyl acetate (40 ml.) and the solution was diluted with ether (160 ml.). The resulting precipitate was removed by filtration and the filtrate was concentrated to ca. 10 ml. Cooled and scratching the walls of the container induced crystallisation. The crystals were collected by filtration, washed with a little ethyl acetate, then stirred in petroleum ether (100 ml.; B.P. 40–60°) for 30 min., again collected by filtration, and dried, giving 3-methylthiomethyl-7β-(2′-thienylacetamido) ceph-3-em-4-carboxylic acid (1.80 g.), M.P. 146–148° (decomp.), R$_F$~0.60 (system 1), $\lambda_{max.}$ (EtOH) 237, 266 nm. ($\epsilon$ 13,200, 7,950), $\nu_{max.}$ (CHBr$_3$) 1770 (β-lactam), 1730 (carboxylic acid), 1676, 1504 cm.$^{-1}$ (amide), τ (D$_2$O with NaHCO$_3$) 2.6, 3.05 (3-proton multiplets; thienyl protons), 4.42 (1-proton doublets, J 5 Hz; C–7 H), 4.93 (1-proton doublet, J 5 Hz; C–6 H), 6.12 (2-proton singlet; CH$_2$CONH), 6.26, 6.61 [two 1-proton doublets (branches of a quartet), J 17 Hz; C–2 H$_2$], 6.61 (2-proton singlet; C–3 CH$_2$), 8.00 (3-proton singlet; SCH$_3$). (Found: C, 46.8; H, 4.2; N, 7.4; S, 24.4; C$_{15}$H$_{17}$N$_2$O$_4$S$_3$ requires C, 46.9; H, 3.9; N, 7.3; S, 25.0%).

EXAMPLE 6

Alternative preparation of 3-methylthiomethyl-7β-(2′-thienylacetamido)-ceph-3-em-4-carboxylic acid 3 - dichloroacetoxymethyl - 7β-(2′-thienylacetamido)-ceph-3-em-4-carboxylic acid (prepared in the manner described in Example 4b) (9.04 g., 19.5 mmole) was dissolved in acetone (60 ml.) and refluxed at 60° for 4 hours with a solution of methanethiol (16.0 g., 0.33 mole, 17 equivalents), using a condenser at −70°. The solvents were removed and the oil partitioned between water and ethyl acetate. The organic phase was extracted into sodium bicarbonate solution (pH 8.0), which was washed with ethyl acetate, acidified, and extracted into ethyl acetate. The extraction into sodium bicarbonate and acidification was repeated twice. The final ethyl acetate solution was washed successively with water and brine, and was dried and evaporated to give a yellow oil (7 g.), which was dissolved in ethyl acetate (7 ml.). Scratching the glass walls of the vessel instigated crystallisation of the title compound. The filtrate was poured slowly into petroleum ether, to give more product (0.96 g., 13% yield). The crystalline crop (2.55 g., 34% yield) had M.P. 148.5– 149° (decomp.), $[\alpha]_D^{23}+57.9°$ (c. 0.7, tetrahydrofuran), $\lambda_{max.}$ (ethanol) 236 ($\epsilon$ 13,250) and 267 nm. ($\epsilon$ 8,250), $\nu_{max.}$ (bromoform) 1775 (β-lactam), 1725 (CO$_2$H), and 1680 and 1510 cm.$^{-1}$ (—CONH), N.M.R. (deuterochloroform) τ 7.92 (3-proton singlet; SCH$_3$), R$_F$ 0.6. (system 1).

EXAMPLE 7

3-n-butylthiomethyl-7β-(2′-thienylacetamido)ceph-3-em-4-carboxylic acid

Sodium 3 - acetoxymethyl - 7β-(2′-thienylacetamido) ceph-3-em-4-carboxylate (12.56 g., 0.03 mole) was stirred in water (120 ml.) for 15 min., the mixture filtered to remove traces of undissolved material, and the filtrate was reacted at 80° for 2 hr. with n-butanethiol (8.18 g., 0.09 mole). The heterogeneous reaction mixture was vigorously stirred throughout. The reaction mixture, pH 5.3, was cooled and it was extracted with ethyl acetate (300 ml.). This extract was washed successively with water (100 ml.) and brine (100 ml.), dried and the solvent evaporated, leaving a brown gum (8.20 g.) which contained the desired product together with a less polar material (detected by thin-layer chromatography). The pH of the aqueous phase after the ethyl acetate extraction was adjusted to pH 2, which was further extracted with ethyl acetate (3× 100 ml.). This extract was processed to give a yellow-brown solid (3.90 g.) which was shown to contain at least four components (T.L.C.) and was discarded. The brown gum (8.20 g.) was stirred for 30 min. under ether (5 ml.) and petroleum-ether (10 ml., B.P. 40–60°), then under petroleum-ether (15 ml.), and dried, giving another gum (5.61 g.) which contained less of the relatively non-polar constituent than the original gum. The partially purified gum (5.60 g.) was dissolved in acetone (10 ml.) and the solution was treated with dicyclohexylamine (8 ml.). After refrigeration for 4 hours the precipitate was collected by filtration, washed with a little acetone and ether, and dried, giving dicyclohexylammonium 3 - n - butylthiomethyl - $7\beta$-($2'$-thienylacetamido)ceph-3-em-4-carboxylate as an off-white solid (2.34 g.); homogeneous by T.L.C. A portion (2.14 g.) of this salt was suspended in water (75 ml.) and ethyl acetate (75 ml.), and the mixture was stirred while 2 N-hydrochloric acid was added to bring the pH to 2. The ethyl acetate layer was collected and combined with further ethyl acetate extracts (3× 75 ml.) of the aqueous solution. The extract was washed successively with water (2× 150 ml.) and brine (75 ml.), dried (magnesium sulphate), and the solvent evaporated, leaving 3-n-butylthiomethyl - $7\beta$ - ($2'$-thienylacetamido)-ceph-3-em-4-carboxylic acid as a pale yellow solid (1.33 g.), $[\alpha]_D^{20}$ +52.0° (c. 1.00, dioxan), $\lambda_{max}$. (pH 6 buffer) 235, 264 nm. ($\epsilon$ 14,200, 10,800), $\nu_{max}$. (bromoform) 1782 ($\beta$-lactam), 1740 ($CO_2H$), 1690, 1520 cm.$^{-1}$ (amide). $\tau$ (deuterium oxide with sodium bicarbonate) 2.67–3.20 (3-proton multiplet; thienyl protons), 4.45 (1-proton doublet, J 4 c./sec.; C–7 H), 5.02 (1-proton doublet, J. 4 c./sec.; C–6H), 6.17 (2-proton singlet, $CH_2CO$), 6.2–7.0 (4-proton multiplets; C–$2H_2$, C–3 $CH_2$), 7.3–9.5 (S-n-Bu). [Found: C, 49.9; H, 5.0; N, 6.2; S, 22.2; $C_{18}H_{22}N_2O_4S_3$ (427) requires C, 50.7; H, 5.2; N, 6.6; S, 22.5%].

EXAMPLE 8

3-($1'$-methylpropylthiomethyl)-$7\beta$-($2'$-thienylacetamido)-ceph-3-em-4-carboxylic acid A solution of 3-dichloroacetoxymethyl-$7\beta$-($2'$-thienylacetamido)-ceph-3-em-4-carboxylic acid (prepared in the manner described in Example 4b) (4.03 g., 8.3 mmols) in acetone (30 ml.) was treated with 2-butanethiol (14.9 g., 18.1 ml.; 20 equivalents) in acetone (20 ml.), and water (30 ml.) was added. Acetone (35 ml.) was added to homogenise the solution, which was then kept at 60° for 2 hours. The acetone was removed by distillation, and the oily mixture was extracted into sodium bicarbonate, which was washed with ethyl acetate, and acidified to pH 2.5 and extracted into ethyl acetate. The alkali extraction and acidification procedure was then repeated twice, and the organic layer was washed twice with water and brine, dried, evaporated to small bulk, and the product precipitated from light petroleum, giving the title compound as a colourless powder (998 mg.). M.P. 66.5–69.5° C. (decomp.), $[\alpha]_D^{25}$+51.7° (c. 1.5, tetrahydrofuran), $\lambda_{max}$. (ethanol) 260 nm. ($\epsilon$ 7,200), $\nu_{max}$. (bromoform) 1778 ($\beta$-lactam), 1725 ($CO_2H$), and 1685 and 1515 cm.$^{-1}$ (CONH), N.M.R. (deutrochloroform), $\tau$ 8.77 (3-proton quartet) (—SCH($CH_3$)Et) 9.09 (3-proton broad triplet (S—CH($CH_3$)$CH_2CH_3$), 8.5 (2-proton multiplet) (—S—CH($CH_3$)$CH_2CH_3$), $R_F$ 0.89 (system I) (Found: C, 49.9; H, 5.1; N, 6.2; S, 20.2%. $C_{18}H_{22}N_2O_4S_3$. $\frac{1}{2}H_2O$ requires C, 49.7; H, 5.3; N, 6.45; S, 22.0%). This compound appears to be a mixture of diastereoisomers, owing to the new centre of asymmetry on the side-chain attached to the 3-position.

EXAMPLE 9

3-t-butylthiomethyl-$7\beta$-($2'$-thienylacetamido)-ceph-3-em-4-carboxylic acid 3 - dichloroacetoxymethyl - $7\beta$-($2'$-thienylacetamido)-ceph-3-em-4-carboxylic acid (prepared in the manner described in Example 4b) (7.5 g., 15 mmols) was dissolved in acetone (40 ml.). t-Butylthiol (29.16 g., 2.15 equivalents) was added in acetone (170 ml.) and water (140 ml.), giving 2 layers. Acetone (120 ml.) was added, and the homogeneous solution kept at 60° for 2½ hours. The acetone was evaporated off, and the oil partitioned between ethyl acetate and water. The ethyl acetate was extracted with sodium bicarbonate solution, which was washed with ethyl acetate, acidified to pH 2.5, and extracted with ethyl acetate. The product from the organic layer was then extracted with alkali and reacidified as above. The final ethyl acetate solution was washed with water and brine, then dried and evaporated to 20 ml., treated with ether (60 ml.), filtered, and evaporated. The gum was dissolved in ethyl acetate and precipitated with light petroleum to give the title compound as a pale yellow solid (910 mg., 13%), M.P. 95–100° (decomp.), $[\alpha]_D^{22}$ +51.7° (c. 0.89, tetrahydrofuran), $\lambda_{max}$. (ethanol) 260 nm. ($\epsilon$ 6000), $\nu_{max}$. (bromoform) 1776 ($\beta$-lactam), 1730 ($CO_2H$), and 1680 and 1512 cm.$^{-1}$ (—CONH), N.M.R. (deutreochloroform) $\tau$ 8.67 (9-proton singlet) (S—C($CH_3$)$_3$), $R_F$ 0.85 (system I) (Found: C, 50.4; H, 5.3; N, 6.2; S. 19.9; $C_{18}H_{22}N_2O_4S_3$ requires C, 50.7; H, 5.16; N, 6.6; S, 22.6%).

EXAMPLE 10

3-methoxycarbonylmethylthiomethyl-$7\beta$-($2'$-thienyl-acetamido)-ceph-3-em-4-carboxylic acid 3 - dichloroacetoxymethyl - $7\beta$-($2'$-thienylacetamido)-ceph-3-em-4-carboxylic acid (prepared in the manner described in Example 4b) (4.603 g., 10 mmols) was dissolved in methyl thioglycollate (10.75 g. 100 mmols, 10 equiv.) and stirred at 65° for 30 minutes. The reaction mixture was partitioned between water and ethyl acetate at pH 8.5, and the aqueous layer was acidified to pH 2.5 and extracted into ethyl acetate. The ethyl acetate layer was extracted with sodium bicarbonate, which was then washed with ethyl acetate, acidified to pH 2.5 and extracted with ethylacetate. The organic solution was washed successively with water and brine, dried, and evaporated. The resultant gum was crystallised from ethyl acetate to give the title compound (1.05 g. 24%); the mother liquors yielded more crude product (886 mg., approx. 19%).

The crystalline sample had M.P. 136–140° (dec.) $[\alpha]_D^{24}$ +42° (c. 1.1 tetrahydrofuran), $\lambda\lambda_{max}$. (pH6 phosphate) 235 nm. ($\epsilon$ 14,500), 262 nm. ($\epsilon$ 10,300), $\nu_{max}$. (Nujol) 1770 ($\beta$-lactam), 1732 ($CO_2R$), 1650 and 1525 (CONH), 1720 and 1706 ($CO_2H$), and 3300 cm.$^{-1}$ (NH). NMR ($D_2O$ with $NaHCO_3$) $\tau$ 2.5 to 3.0 (3-proton multiplet; 2-thienyl), 4.36 (1-proton doublet. J=Hz.; C-7H) 4.90 (1-proton doublet J=5Hz.; C-6H) 6.09 (2-proton singlet; —$CH_2CONH$), 6.24 3-proton singlet; COOMe) 6.58 (2-proton singlet; —$SCH_2$—$CO_2R$), 6.1 to 6.7 (4-protons; C—2 2H and C—3—$CH_2$), (Found C, 45.6; H, 4.2; N, 5.8; S, 20.5. $C_{17}H_{18}N_2O_6S_3.\frac{1}{2}H_2O$ requires C, 45.4; H, 4.2; N, 6.2; S, 21.2%), $R_F$ 0.41 (system 1).

EXAMPLE 11

Disodium salt of 3-carboxymethylthiomethyl-$7\beta$-($2'$-thienylacetamido)ceph-3-em-4-carboxylic acid 3-dichloroacetoxymethyl - $7\beta$ - ($2'$-thienylacetamido)-ceph-3-em-4-carboxylic acid (prepared in the manner described in Example 4 (b)) (3.76 g. 8 mmole) was dissolved in thioglycollic acid (11.3 ml., 160 mmole) and stirred for 2 hours at 60°. The reaction mixture was partitioned between ethyl acetate and water, and the organic layer was extracted with sodium bicarbonate, which was then acidified to pH 2.5 and extracted with ethyl acetate: the organic layer was washed with warm water, and re-tracted into sodium bicarbonate, which was acidified and extracted with ethyl acetate. The ethyl acetate solution was washed with water, then brine, dried, and evaporated. This product was dissolved in acetone (2 ml.) and treated with N sodium 2-ethylhexanoate (4.4 ml.) in acetone. The immediate precipitate was filtered, washed and dried to give a pale yellow powder (885 mg.), M.P. 56–85° $[\alpha]_D^{24}$ +57.6° (C, 0.9 water with 2 drops saturated $NaHCO_3$ in 10 ml. $\lambda\lambda_{max.}$ (pH6; 0.02 M aqueous phosphate) 236 nm. ($\epsilon$ 12,600), 332 nm. ($\epsilon$ 1,700)$\lambda_{inf}$ 261 nm. ($\epsilon$ 8,000), $\nu_{max.}$ (Nujol), 1758 ($\beta$-lactam), 3280 (NH), 1600 ($CO_2^-$), 1670 and 1540 cm.$^{-1}$ (amide), NMR ($D_2O$) $\tau$ 2.5 to 3.1 (3-proton multiplet: 2-thienyl), 4.42 (1-proton doublet, J=5 Hz.) 4.92 (1-proton doublet, J=5 Hz.) 6.10 (2-proton singlet), 6.3 to 6.9 (6 protons: multiplet) $R_F$ 0.00 (fluorescent), 0.07 (strong), 0.12 (fluorescent) 0.5 (weak) (system 1). (Found: C, 39.9; H, 3.4; N, 5.2; S, 21.1 $C_{16}H_{15}N_2O_6S_3Na$ requires C, 42.5; H, 3.4; N, 6.2; S, 21.4%). The product contained about 60% of 3-carboxymethylthiomethyl - 7$\beta$ - (2'-thienylacetamido)-ceph-3-em-4-carboxylic acid as the disodium salt. The rotation was measured on the free acid, $[\alpha]_D^{24}$+22.8 (C 0.92, tetrahydrofuran).

In a similar experiment 3-dichloroacetoxymethyl-7$\beta$-(2'-thienylacetamido)-ceph-3-em-4-carboxylic acid (2.7 g., 5.8 mmole) and thioglycollic acid (1.64 ml., 4 equiv) were reacted in acetone:water=3:5 (50 ml.) for 2 hours at 60°. The product had similar characteristics to the previous sample, and had $R_F$ 0.0 (fluorescent), 0.12 (strong) and 0.39 (medium) (system 1).

EXAMPLE 12

3-(2'-mercaptoethylthiomethyl)-7$\beta$-(2'-thienylacetamido)-ceph-3-em-4-carboxylic acid 3-dichloroacetoxymethyl - 7$\beta$ - (2'-thienylacetamido)-ceph-3-em-4-carboxylic acid (prepared in the manner described in Example 4(b)) (495 mg., 1.06 mmole) was dissolved in acetone (9 ml.) and water (2 ml.) 1,2-ethanedithiol (2.26 g., 21.2 mmole) was added and the solution was stirred at 60° for 4 hours, when it was partitioned between ethyl acetate and water at pH 8.0. The aqueous layer was acidified to pH 2.0, and extracted with ethyl acetate which was reextracted with sodium bicarbonate.

The aqueous layer was acidified and extracted with ethyl acetate which was washed with water, then brine, dried, and evaporated to a small volume. Ether (3 volumes) was added, the solution was filtered, partially evaporated, and added dropwise to petroleum spirit to give a pale yellow powder M.P. 65–95° (decomp), $[\alpha]_{D24}$+75° (C, 0.92 tetrahydrofuran), $\lambda\lambda_{max.}$ (pH 6 phosphate) 233–236 nm. ($\epsilon$ 13,800) 263 nm. ($\epsilon$ 9,350). $\nu_{max.}$ (Nujol) 1775 ($\beta$-lactam), 1668 and 1535 (amide), and 1720 cm.$^{-1}$ ($CO_2H$), NMR ($CDCl_3$) $\tau$ 2.5–3.0 (3-proton multiplet), 4.20 (1-proton double doublet, J 8Hz, 4 Hz.), 4.94 (1-proton doublet, J 4 Hz.), 6.1 (2-proton singlet) 5.9 to 6.7 (4-protons; multiplet), 7.0 to 7.5 (4 protons; multiplet) 8.3 (1-proton; broad peak). The product contains 3-(2'-mercaptoethylthiomethyl) - 7$\beta$ - (2' - thienylacetamido)-ceph-3-em-4-carboxylic acid. The product had $R_F$ 0.65 (system 1); this was the only spot detectable under ultraviolet light.

EXAMPLE 13

7$\beta$-benzylthiomethylcarbonamido-3-methylthiomethyl-ceph-3-em-4-carboxylic acid Sodium 3 - acetoxymethyl-7$\beta$-benzylthiomethylcarbonamido-ceph-3-em-4-carboxylate (4.12 g., 0.009 mole) in water (45 ml.) was treated with methanethiol (1.30 g., 0.027 mole) in a sealed-glass tube at 70° for 3 hr. The impure product was recovered in the usual way in ethyl acetate (150 ml.). To separate the desired product from some neutral material this solution was extracted with 3%-sodium bicarbonate (4× 150 ml.) leaving material TLC $R_F$ 0.95, in the ethyl acetate. The bicarbonate was acidified to pH 2.0 under ethyl acetate (200 ml.) and the acidic material recovered in the usual way as a pale yellow syrup (2.48 g.), TLC $R_F$ 0.48. A portion (2.00 g.) of this gum was dissolved in acetone (20 ml.) and the solution was treated with dicyclohexylamine (1.3 ml.). After refrigeration for 1 hr. the precipitate was collected by filtration, washed with acetone (5 ml.) and ether (2× 20 ml.) and dried, giving dicyclohexylammonium 7$\beta$-benzylthiomethylcarbon amido - 3 - methylthiomethyl-ceph-3-em-4-carboxylate as a powder (1.52 g.). This salt was dissolved in ethylacetate (100 ml.) and 0.5 N-hydrochloric acid (100 ml.). The acidic material was recovered in the usual way as a foam (0.98 g.) which was triturated with petroleum-ether giving 7$\beta$ - benzylthiomethylcarbonamido-3-methylthiomethyl-ceph-3-em-4-carboxylic acid as a colourless powder (0.74 g.), M.P. 108–110° (shrinks at 105°), $R_F$ 0.42 (system 1), $R_F$ 0.66 (system 2), TLC $R_F$ 0.48, $\lambda_{max.}$ (pH6 buffer) 263 nm. ($\epsilon$ 10,600), $\nu_{max.}$ (Nujol) 1770 ($\beta$-lactam), 1705 (carboxylic acid), 1610, 1520 cm.$^{-1}$ (amide). $[\alpha]_D^{25}$+73.7° (cl. 00, dioxan) p.m.r. (100 mHz.) $\tau$ ($CDCl_3$) 1.18 (1-proton broad singlet; $CO_2H$), 2.43 (1-proton doublet, J 9 Hz.; CONH). 2.78 (5-proton singlet; phenyl protons), 4.30 (1-proton double doublet, J 4.5, 9 Hz.; C-7 H), 4.96 (1-proton doublet, J 4.5 Hz.; C-6 H), 6.11, 6.60 [two 1-proton doublets (branches of a quartet), J 13 Hz.; C-3 $CH_2$], 6.26 (2-proton singlet; $PhCH_2$), 6.40 (2-proton broad singlet; C-2 $H_2$), 6.84 (2-proton singlet; $SCH_2CO$), 7.95 (3-proton singlet; $SCH_3$). [Found: C, 51.1; H, 4.8; N, 6.2; S, 20.5. $C_{18}H_{20}N_2S_3O_4$ (424.6) requires C, 51.0; H, 4.8; N, 6.7; S, 20.5%].

EXAMPLE 14

3-methylsulphinylmethyl-7$\beta$-(2'-thienylacetamido)-ceph-3-em-4-carboxylic acid (a) Oxidation with chromic oxide. — 3-methylthiomethyl - 7$\beta$-(2'-thienylacetamido)-ceph-3-em-4-carboxylic acid (prepared as described in Example 4) (1.6 g., 4.2 mmole) was dissolved in acetone (30 ml.) at 0°, and 1.3 ml. of 8 N-chromium trioxide in water: sulphuric acid ($=3:1$) was slowly added with very vigorous stirring. After the stirring had been maintained for two minutes the mixture was poured into water and extracted with ethylacetate. The organic phase was washed with water and brine, dried, and evaporated to small bulk giving crystals (90 mg.) and a filtrate which was added slowly to petroleum spirit to give a colourless solid (306 mg.). Continuous ethyl acetate extraction of the aqueous phase gave a further 50 mg. of crude product. The crystalline sample had M.P. 148–150° (dec.), $[\alpha]_D^{22}$ −46° (C 0.8; tetrahydrofuran containing 3 drops dimethylsulphoxide per ml.) $\lambda\lambda_{max.}$ (pH 6 phosphate) 233 nm. ($\epsilon$ 11,800), 270 nm. ($\epsilon$ 9,200), $\nu_{max.}$ (Nujol) 1780 ($\beta$-lactam) 1660 and 1538 (amide), 1700 ($CO_2H$), 1000 cm.$^{-1}$ (S=O), NMR ($D_2O$ containing $NaHCO_3$), 2.5 to 3.0 (3-proton multiplet; 2-thienyl), 4.34 (1-proton doublet, J 4 Hz.; C-7 H), 4.86 (1-proton doublet, J 4 Hz.; C-6H), 6.08 (2-proton singlet; R—$CH_2CON$), 5.62 and 6.24 (two 1-proton doublets, J=15 Hz.; 3—$CH_2SO$), 6.27 and 6.67 (two 1-proton doublets, J=15 Hz.; 2—C $CH_2$), 7.27 (Sharp 3-proton singlet).

The NMR spectrum at 100 mHz. gave a similar result except that there was clear evidence of splitting of the C-7H resonance which was observed as a pair of closely spaced doublets—possibly evidence for the compounds being a mixture of diastereoisomers. (Note: the 6.0 to 6.7 region is complex because of overlap) (Found: C, 43.0; H, 4.0; N, 6.7; S, 22.4; $C_{15}H_{16}N_2O_5S_3 \cdot H_2O$ requires C, 43.0; H, 4.2; N, *.7; S, 2.9.) $R_F$ 0.08 (system 1).

(b) Oxidation with dibenzoyl peroxide.—3-methylthiomethyl - 7β-(2'-thienylacetamido)-ceph-3-em-4-carboxylic acid (500 mg., 1.3 mmole) and dibenzoyl peroxide (721 mg. of 70% material, 1.6 equiv.) were dissolved in tetrahydrofuran (20 ml.) and the solution was stirred at 70° for 30 minutes. On cooling, ethyl acetate (3 volumes) was added and the solution evaporated to small bulk, giving crystals (111 mg. 21%) and a filtrate, which was added dropwise to petroleum spirit to yield a white solid (339 mg. approx. 64% yield), which contained some starting material. The crystalline sample had M.P. 147–150° (dec.), $[\alpha]_D^{24}$ —44.6° (c. 0.92; tetrahydrofuran containing 2 drops dimethylsulfoxide per ml.). $\lambda\lambda_{max}$. (pH 6 phosphate) 233 nm. (ε 13,150), 268 nm. (ε 9,600). The IR and NMR spectra resembled that of authentic material.

(c) Oxidation with sodium periodate.—3-methylthiomethyl - 7β-(2'-thienylacetamido)-ceph-3-em-4-carboxylic acid (45 mg., 0.12 mmole) was dissolved in water (2 ml.) containing sodium bicarbonate (1-equivalent). Sodium periodate (25 mg., 0.12 mmole) in water (0.5 ml.) was added to the solution at 0°. The rapidly yellowing solution was stirred at 0° for 1 hour and the product examined chromatographically, $R_F$ 0.0 (fluorescent) 0.06–0.15 (medium) 0.5 (medium) (system 1). The starting material had $R_F$ 0.5. An authentic sample of the title compound had $R_F$ 0.08.

(d) Oxidation with oxygen and tetrahydrofuran.—3-methylthiomethyl - 7β-(2'-thienylacetamido)-ceph-3-em-4-carboxylic acid (0.512 g.) was dissolved in tetrahydrofuran (50 ml.) known to contain some peroxide. A small quantity of the sulphoxide was immediately formed ($R_F$ 0.08). Oxygen was slowly bubbled through the solution at 25° for 20 hours. Chromatography showed an increase in the product with $R_F$ 0.08 (system 1). The solution was diluted with ethyl acetate (approx. 2 volumes) and partially evaporated to give a crystalline product (58 mg.) and a filtrate, which was added slowly to petroleum spirit giving a white solid (408 mg.). The crystalline sample was shown to be the title sulphoxide by its NMR spectrum and $R_F$. The precipitated product was contaminated with about 50% of the staring thioether.

(e) Oxidation with peracetic acid.—A solution of 3-methylthiomethyl - 7β - (2'-thienylacetamido)-ceph-3-em-4-carboxylic acid (51 mg., 0.13 mmole) in tetrahydrofuran (2 ml.) was reacted with peracetic acid (0.10 mmole) at 0° during 5 minutes. The mixture was analysed chromatographically and shown to have at least 4 components, $R_F$ 0.15, 0.25, 0.4 and 0.54 (system 3). The title sulphoxide had $R_F$ 0.25 and the starting compound had $R_F$ 0.54 under these conditions.

EXAMPLE 15

Preparation of 3-n-propylthiomethyl-7β-(2'-thienylacetamido)ceph-3-em-4-carboxylic acid The title compound was prepared via the following reaction scheme (the steps are described in more detail below).

Diphenylmethyl 3 - hydroxymethyl - 7β-(2'-thienylacetamido)ceph-3-em-4-carboxylate ↓ (a)

Diphenylmethyl 3 - chloromethyl - 7β-(2'-thienylacetamido)ceph-3-em-4-carboxylate ↓ (b)

Diphenylmethyl 3 - iodomethyl - 7β - (2'-thienylacetamido)ceph-3-em-4-carboxylate ↓ (c)

Diphenylmethyl 3 - n-propylthiomethyl-7β-2'-thienylacetamido)ceph-3-em-4-carboxylate ↓ (d)

3 - n-propylthiomethyl - 7β - (2'-thienylacetamido)ceph-3-em-4-carboxylic acid (a) Diphenylmethyl 3-chloromethyl-7β-(2'-thienylacetamido)ceph-3-em-4-carboxylate Diphenylmethyl 3 - hydroxymethyl - 7β - (2'-thienylacetamido)ceph-3-em-4-carboxylate [prepared as described in Example 4(a)] (5.2 g., 10 mmole) and pyridine (4 ml., 40 mmole) in dry tetrahydrofuran (75 ml.) were added dropwise at 20° to a solution of thionyl chloride (2.38 g., 1.45 ml.; 20 mmole) in dry tetrahydrofuran (25 ml.) during one hour. After 15 minutes the mixture was poured into brine and the product extracted into ethyl acetate; the organic extract was dried and concentrated. The concentrate was added dropwise to petroleum ether (B.P. 40–60°) and the solid product (3.9 g., 73%) collected. A sample was crystallised from ethanol, $[\alpha]_D^{23}$=6.5° (c.=1.0, tetrahydrofuran), $\lambda\lambda_{max}$. (ethanol) 235 nm. (ε 13,200), 266 nm. (ε 8,000), $\nu_{max}$. (bromoform) 3390 (NH), 1785 (β-lactam), 1725 (COOR), 1682 and 1510 cm.$^{-1}$ (CONH); τ (CDCl$_3$) 5.63, 3-methylene group singlet. (Found: C, 60.7; H, 4.7; N, 4.7; S, 11.7; Cl, 6.2 $C_{27}H_{23}N_2O_4S_2Cl$ requires, C, 60.2; H, 4.3; N, 5.2; S, 11.9; Cl, 6.6%), $R_F$=0.47 (Silica plates, benzene:ethyl acetate=5:1).

(b) Diphenylmethyl 3-iodomethyl-7β-(2'-thienylacetamido)ceph-3-em-4-carboxylate

Diphenylmethyl 3 - chloromethyl - 7β-(2'-thienylacetamido)ceph-3-em-4-carboxylate (7.858 g., 14.5 mmole) was dissolved in acetone and reacted with sodium iodide (7.8 g., 50 mmole) in acetone (100 ml.) in the dark for 90 minutes. At the end of this time the solution was filtered and poured into water (750 ml.) containing sodium chloride and sodium thiosulphate. The oil was extracted with ether (4×), and the organic layer washed once with water and twice with brine, and dried and evaporated to a foam, which was crystallised from ethyl acetate (16 ml.) to give the title compound. The mother liquors were washed with sodium thiosulphate, water and brine, and were dried and evaporated to a foam (2.75 g., impure title compound, approx. 30% yield). Yield of crystalline material 60%, M.P. 155–161° C. (decomp.), $[\alpha]_D^{28}$—86.3° (c. 0.73; tetrahydrofuran), $\lambda_{max}$. (ethanol) 290 nm. (ε 8,400), $\nu_{max}$. (Nujol) 1773 (β-lactam), 1717 (CO$_2$R), and 1670 and 1520 cm.$^{-1}$ (—CONH—), N.M.R. (deuterochloroform) τ 5.70 (2-proton broad singlet) (CH$_2$I) (Found: C, 51.6; H, 3.7; I, 19.7; N, 4.3; S, 10.2. $C_{27}H_{23}IN_2O_4S_2$ requires C, 51.3; H, 3.7; I, 20.1; N, 4.4; S, 10.2), $R_F$ 0.65 (Kieselgel G, benzene-ethyl-acetate=5:1) (T.L.C.).

(c) Diphenylmethyl 3-n-propylthiomethyl-7β-(2'-thienylacetamido)-ceph-3-em-4-carboxylate Diphenylmethyl 3 - iodomethyl - 7β - (2'-thienylacetamido)-ceph-3-em-4-carboxylate (202 mg., 0.32 mmole) was dissolved in dry tetrahydrofuran (5 ml.). Mercuric perchlorate (99 mg., 0.32 mmole) in dry tetrahydrofuran (5 ml.) and n-propanethiol (0.59 ml. 6.5 mmole) were added. After 90 minutes at 22° the mixture was poured into water and extracted with ethyl acetate. The organic phase was washed with water and brine, and was dried and evaporated. The residue was dissolved in ethyl acetate, filtered, and poured slowly into light petroleum, giving a powder (50 mg.), N.M.R. (deuterochloroform) τ 9.15 (3-proton triplet, (—S—CH$_2$CH$_2$CH$_3$)), $R_F$ 0.84 (Kieselgel G, benzene: ethyl acetate=5:1) (thin layer chromatography).

(d) 3-n-Propylthiomethyl-7β-(2′-thienylacetamido)ceph-3-em-4-carboxylic acid In a manner analogous to that described in Example 4(b) the diphenylmethyl group of diphenylmethyl 3-n-propylthiomethyl-7β-(2′-thienylacetamido)-ceph - 3 - em-4-carboxylate was removed by acid hydrolysis using trifluoracetic acid in conjunction with anisole to yield the title compound. This compound showed the same characteristics as the product of Example 4(c).

EXAMPLE 16

3-methylthiomethyl-7β-phenoxyacetamidoceph-3-em-4-carboxylic acid

(i) From sodium 3-acetoxymethyl-7β-phenoxyacetamidoceph-3-em-4-carboxylate

Sodium 3 - acetoxymethyl - 7β-phenoxyacetamidoceph-3-em-4-carboxylate (2.80 g., 0.0065 mole) in water (45 ml.) was treated with methanethiol (0.94 g., 0.0195 mole) in a sealed-glass tube at 70° for 3 hr. The impure product was recovered as described in Example 1 in ethyl acetate (100 ml.). To separate the desired product from some neutral material, this solution was extracted with 3%-sodium bicarbonate (5× 50 ml.), leaving material, TLC $R_F$ 0.95, in the ethyl acetate. The bicarbonate was acidified to pH 2.0 under ethyl acetate (200 ml.) and the acidic material recovered in the usual way as a colourless foam (0.87 g.), TLC $R_F$ 0.57 (some impurity at $R_F$ 0.95). This foam was dissolved in acetone (5 ml.) and the solution treated with 10% (w./v.) sodium 2-ethylhexanoate in acetone (5 ml.). After refrigeration for 2 hr. the precipitate was collected by filtration, washed with acetone and dried in vacuo, giving sodium 3-methylthiomethyl - 7β - phenoxyacetamidoceph - 3 - em-4-carboxylate as a colourless powder (0.63 g., 23%), TLC $R_F$ 0.57, $R_F$ 0.80 (system 2), M.P. 192–196° (decomp.), $[\alpha]_D^{24}$ +72.6° (c. 1.00, water, $\lambda_{max}$ (pH 6 buffer) 263–266 nm. (ε 11,070), $\nu_{max}$ (Nujol) 1754 (β-lactam), 1688, 1520 (CONH), 1590 cm.$^{-1}$ ($CO_2^-$), τ($D_2O$) 2.5–3.3 (5-proton multiplet; aromatic protons) 4.37 (1-proton doublet, J 5 Hz., C-7 H), 4.93 (1-proton doublet, J 5 Hz.; C-6 H), 5.43 (2-proton singlet; —$OCH_2$—), 6.29, 6.80 [two 1-proton doublets (branches of a quartet), J 14 Hz., C-3 $CH_2$], 6.39, 6.80 [two 1-proton doublets (branches of a quartet), J 18 Hz.; C-2 $H_2$], 8.00 (3-proton singlet; $SCH_3$). [Found: C, 47.3; H, 3.9; N, 5.7; S, 14.8; Na, 5.7. $C_{17}H_{17}N_2O_5S_2Na.H_2O$ (434.5) requires C, 47.0; H, 4.4; N, 6.4; S, 14.8; Na, 5.4%].

(ii) From 3-acetoxymethyl-7β-aminoceph-3-em-4-carboxylic acid (a) 3 - acetoxymethyl- - 7β - aminoceph - 3 - em-4-carboxylic acid (2.72 g., 0.01 mole) was stirred in a solution of sodium hydroxide (0.40 g., 0.01 mole) in water (50 ml.) for 5 min. The mixture was filtered to remove some undissolved material and the filtrate was treated with methanethiol (1.44 g., 0.03 mole) in a sealed glass tube at 80° for 2 hr. The dark solution was acidified to pH 3.5 with 2 N-hydrochloric acid and the resultant brown precipitate was collected by filtration, washed well with water, methanol, and ether, and dried, giving crude 7β - amino - 3 - methylthiomethylceph - 3 - em - 4 - carboxylic acid as a brown powder (0.35 g.), $\lambda_{max}$ (pH 6 buffer) 267 nm. (ε 5,000), $\nu_{max}$ (Nujol) 1795 (β-lactam), 1620 cm.$^{-1}$($CO_2^-$), τ (deuterium oxide with sodium bicarbonate) 7.97 ($SCH_3$).

(b) Phenoxyacetyl chloride (1.42 g., 0.0083 mole) in acetone (10 ml.) was added over 5 min. to a cold (0–5°) stirred solution of 7β-amino-3-methylthiomethylceph-3-em-4-carboxylic acid (1.95 g., 0.0075 mole) and sodium bicarbonate (1.89 g., 0.0225 mole) in water (30 ml.) and acetone (30 ml.). The mixture was stirred for 50 min. then the acidic material was recovered in the usual way as a yellow foam (2.10 g.), TLC $R_F$ 0.39 (impurity with $R_F$ 0.0). This foam was dissolved in acetone (20 ml.), and dicyclohexylamine (0.91 g.) was added. Petrol (B.P. 40–60°) was added until cloudiness persisted, then the mixture was refrigerated for 90 min. The precipitate was collected by filtration, washed with a little acetone and dried, giving the crude dicyclohexylamine salt as a fawn powder (1.04 g.). This was dissolved in 0.5N-hydrochloric acid (20 ml.) and ethyl acetate (20 ml.), and the acidic material recovered in the usual way as a pale fawn powder (0.70 g.), TLC $R_F$ 0.39 (elongated spot) (trace impurities at $R_F$ 0.30 and 0.46), $\lambda_{max}$ (ethanol) 262 nm. (ε 7,960), $\nu_{max}$ (Nujol) 1768 (β-lactam), 1720 ($CO_2H$), 1680, 1530 (CONH), 750 cm.$^{-1}$ (phenyl), τ ($CDCl_3$). No further work was done on this material.

EXAMPLE 17

3-methylthiomethyl-7β-vinylacetamidoceph-3-em-4-carboxylic acid

Vinylacetic acid (5.14 g., 0.059 mole) and thionyl chloride (7.02 g., 0.059 mole) were boiled under reflux for 1 hr., then the vinylacetyl chloride (3.00 g.) B.P. 97–99°, was collected by fractional distillation of the mixture.

Vinylacetyl chloride (1.15 g., 0.011 mole) in acetone (16 ml.) was added over 10 min. to a cold (0–5°) stirred carboxylic acid (2.600 g., 0.01 mole) and sodium bicarbonate (2.52 g., 0.03 mole) in water (30 ml.) and acetone (30 ml.). The mixture was stirred for 40 min. at 0–5°, then the acidic material was recovered in the usual way as a solution in ethyl acetate. When this solution was concentrated to a small volume, a pale yellow solid separated. This was collected by filtration, washed with a little ethyl acetate, and dried, giving 3-methylthiomethyl - 7β - vinylacetamidoceph-3-em-4-carboxylic acid (1.80 g., 55%), $R_F$ 0.75 (system 2), $R_F$ 0.44 (system 1) TLC $R_F$ 0.56, M.P. 180–183° (decomp.), $[\alpha]_D^{25}$ +41.4° (c. 1.00, dioxan), $\lambda_{max}$ (ethanol) 266 nm. (ε 7,710), $\nu_{max}$ (Nujol) 1770 (β-lactam), 1726 ($CO_2H$), 1550 cm.$^{-1}$ (CONH), 990, 930 cm.$^{-1}$ ($CH_2$=CHR), τ ($D_2O$ with $NaHCO_3$) 3.7–4.3 (2-proton multiplet; $CH_2$=CH), 4.6–4.8 (1-proton multiplet; $CH_2$=CH.$CH_2$), 4.42 (1-proton doublet, J 5 Hz., C-7 H), 4.89 (1-proton doublet, J 5 Hz.; C-6 H), 6.21, 6.66 [two 1-proton doublets (branches of a quartet), J 18 Hz.; C-2 $H_2$], 6.26, 6.70 [two 1 proton doublets (branches of a quartet), J 14 Hz.; C-3 $CH_2$], 6.89 (2-proton doublet, J 7 Hz.; $CH_2$=CH—$CH_2CO$), 7.98 (3-proton singlet; $SCH_3$). [Found: C, 47.5; H, 5.0; N, 7.9; S, 18.6. $C_{13}H_{16}N_2O_4S_2$ (328.4) requires C, 47.6; H, 4.9; N, 8.5; S, 19.5%].

EXAMPLE 18

7β-methylthiomethylcarbonamido-3-methylthiomethyl-ceph-3-em-4-carboxylic acid Methylthiomethylcarbonyl chloride (1.37 g., 0.011 mole) in acetone (15 ml.) was added over 10 min. to a cold (0–5°) stirred solution of 7β-amino-3-methylthiomethylceph-3-em-4-carboxylic acid (2.60 g., 0.01 mole) and sodium bicarbonate (2.52 g., 0.03 mole) in water (30 ml.) and acetone (30 ml.). The mixture was stirred for 40 min. at 0–5°, then the acidic material was recovered in the usual way as a solution in ethyl acetate. When this solution was concentrated to a small volume, a colourless solid separated. This was collected by filtration, washed with a little ethyl acetate and ether, and dried, giving 7β-methylthiomethylcarbonamido-3-methyl-thiomethylceph-3-em-4-carboxylic acid (1.80 g., 53%), TLC $R_F$ 0.53, $R_F$ 0.73 (system 2), $R_F$ 0.31 (system 1), M.P. 181–184° (decomp.), $[\alpha]_D^{25}$ +55.5° (c. 1.00, dioxan), $\lambda_{max}$ (pH 6 buffer) 263 nm. (ε 9,260), $\nu_{max}$ ($CHBr_3$) 1780 (β-lactam), 1728 ($CO_2H$), 1684, 1518 cm.$^{-1}$ (CONH), τ($D_2O$ with $NaHCO_3$) 4.40 (1-proton doublet, J 4.5 Hz, C-7 H), 4.83 (1-proton doublet, J 4.5 Hz., C-6 H), 6.19, 6.65 [two 1-proton doublets (branches of a quartet), J 18 Hz; C–2 H$_2$], 6.22, 6.70 [two 1-proton doublets (branches of a quartet), J 14 Hz; C–3 CH$_2$], 7.80 (3-proton singlet; CH$_3$SCH$_2$CO), 7.96 (3-proton singlet; C–3 CH$_2$SCH$_3$). [Found: C, 41.9; H, 4.7; N, 7.7; S, 26.9. C$_{12}$H$_{16}$N$_2$O$_4$S$_3$ (348.5) requires C, 41.4; H, 4.6; N, 8.0; S, 27.6%].

EXAMPLE 19

7β-Azidoacetamido-3-methylthiomethylceph-3-em-4-carboxylic acid (Caution: Azidoacetyl chloride may decompose violently. It should be prepared with caution and used expeditiously).

N,N-dimethylformamide (6 drops) was added cautiously to a stirred solution of azidoacetic acid (1.20 g., 0.012 mole) and oxalyl chloride (1.52 g., 0.012 mole) in dry methylene chloride (40 ml.) at 0°. The solution was stirred at 0° for 25 min., then allowed to reach room temperature over 1 hr. The volatile materials were rotary-evaporated, leaving a yellow oil which was dissolved in acetone (15 ml.) and added over 10 min. to a cold (0–5°) stirred solution of 7β-amino-3-methylthiomethylceph-3-em-4-carboxylic acid (2.60 g., 0.01 mole) and sodium bicarbonate (2.52 g., 0.03 mole) in water (30 ml.) and acetone (30 ml.). The mixture was stirred for 40 min. at 0–5°, then the acidic material was recovered in the usual way as a fawn foam (2.18 g.), which was stirred with petrol (B.P. 40–60°) giving a powder (1.63 g.), TLC R$_F$ 0.41 (impurity at R$_F$ 0.16). This powder was dissolved in n-butanol (15 ml.) and treated with 10% (w./v.) sodium 2-ethylhexanoate in n-butanol (10 ml.). After 1 hr. the solid which precipitated was collected by filtration, washed with n-butanol and ether, then dried giving sodium 7β-azidoacetamido-3-methylthiomethylceph-3-em-4-carboxylate as an off-white powder (1.27 g.), TLC R$_F$ 0.41 (trace impurity at R$_F$ 0.16), R$_F$ 0.72 (system 2), R$_F$ 0.42 (system 1), (impurity at R$_F$ 0.05), M.P. 83–100° (decomp.), [α]$_D$ +62° (c. 1.00, water), λ$_{max}$. (pH 6 buffer) 264 nm., (ε 8,900), ν$_{max}$. (Nujol) 2110 (N$_3$), 1757 (β-lactam) 1598 cm.$^{-1}$ (CO$_2^-$), τ (D$_2$O) 4.38 (1-proton doublet, J 5 Hz.; C–7 H), 4.86 (1-proton doublet, J 5 Hz.; C–6 H), 5.90 (2-proton singlet; N$_3$CH$_2$), 6.21, 6.66 [two 1-proton doublets (branches of a quartet), J 18 c./sec.; C–2 H$_2$], 6.23, 6.70 [two 1-proton doublets (branches of a quartet), J 14 c./sec., C–3 CH$_2$], 8.00 (3-proton singlet; CH$_3$S). [Found: C, 34.0; H, 3.5; N, 15.8; S, 14.7; Na, 6.6. C$_{11}$H$_{12}$N$_5$O$_4$S$_2$Na.2H$_2$O (401.4) requires C, 32.9; H, 4.0; N, 17.5; S, 16.0; Na, 5.7%].

EXAMPLE 20

7β-(2'-furylacetamido)-3-methylthiomethylceph-3-em-4-carboxylic acid

Sodium 3-acetoxymethyl-7β-(2'-furylacetamido)ceph-3-em-4-carboxylate (3.80 g., 0.0095 mole) in water (55 ml.) was treated with methanethiol (1.36 g., 0.0285 mole) in a sealed glass tube at 70° for 3 hr. The acidic material was recovered in the usual way as a semi-solid (240 g.), which was crystallised from aqueous acetone giving 7β-2'-furylacetamido)-3-methylthiomethylceph-3-em-4-carboxylic acid as a colourless solid (0.99 g.; 27%), TLC R$_F$ 0.44, R$_F$ 0.79 (system 2) R$_F$ 0.52 (system 1), M.P. 146–150° (decomp.), [α]$_D$ +55.3° (c. 1.00, dioxan), λ$_{max}$. (pH6 buffer) 264 nm. (ε 8,200), ν$_{max}$. (Nujol) 1773 (β-lactam) 1715 (CO$_2$H), 1610, 1518 cm.$^{-1}$, τ(D$_2$O with NaHCO$_3$) 2.53, 3.67 (3-proton multiplets; furyl protons), 4.47 (1-proton doublet J 5 Hz.; C–7 H), 4.91 (1-proton doublet, J 5 Hz.; C–6 H), 6.22, 6.70 [two 1-proton doublets (branches of a quartet), J 14 Hz.; C–3 CH$_2$], 6.27, 6.72 [two 1-proton doublets (branches of a quartet), J 17 Hz.; C–2 H$_2$], 6.28 (2-proton singlet; CH$_2$CON), 8.00 (3-proton singlet; CH$_3$S). [Found: C, 48.3; H, 4.7; N, 7.6; S, 18.0. C$_{15}$H$_{16}$N$_2$O$_5$S$_2$ (368.4) requires C, 49.0; H, 4.3; N, 7.6; S, 17.4%].

EXAMPLE 21

7β-cyanoacetamido-3-methylthiomethylceph-3-em-4-carboxylic acid

N,N-dimethylformamide (1 ml.) was added over 5 min. to a cold (0°) stirred solution of cyanoacetic acid (8.5 g., 0.1 mole) and oxalyl chloride (12.7 g., 0.1 mole) in methylene chloride (50 ml.). The solution was stirred at 0° for 30 min., then allowed to reach room temperature over 1 hr. The volatile materials were rotary evaporated leaving, cyanoacetyl chloride as a red mobile oil (10.4 g.). Cyanoacetyl chloride (2.08 g., 0.02 mole) was added to a refluxing suspension of 7β-amino-3-methylthiomethylceph-3-em-4-carboxylic acid (2.60 g., 0.01 mole) in ethyl acetate (150 ml.). After 25 min. the mixture was filtered, the filtrate cooled and treated with aniline (2.79 g., 0.03 mole). After 1 hr. the mixture was worked up for acidic material in the usual way, giving a brown gum (2.00 g.). This was dissolved in ethyl acetate (150 ml.) and the solution diluted with petrol (B.P. 40–60°) until a slight cloudiness persisted. Vigorous scratching of the walls of the container induced crystallisation. The colourless solid was collected by filtration, washed with a little ethyl acetate, and dried, giving material (0.60 g.) which appeared homogeneous by chromatography (TLC, paper-both systems), but whose spectra (infrared, P 24104; p.m.r. N 19073) indicated a mixture of products. This solid (0.55 g.)w as dissolved in ethyl acetate (10 ml.) and the solution treated with 10% w./v. sodium 2-ethyl hexanoate in n-butanol (4 ml.). After refrigeration for 1 hr. the precipitate was collected by filtration, washed with acetone and ether, then stirred in petrol (30 ml.) for 1 hr., again collected, and dried, giving sodium 7β-cyanoacetamido-3-methylthiomethylceph-3-em-4-carboxylate (0.37 g.), TLC R$_F$0.35, R$_F$ 0.70 (system 2), R$_F$ 0.24 (system 1), M.P.>300°, [α]$_D$+88.2° (c. 100, water) λ$_{max}$. (pH 6 buffer) 263 nm. (ε 9,460), ν$_{max}$. (Nujol) 2272 (C≡N), 1758 (β-lactam), 1670, 1550 (CONH), 1620 cm.$^{-1}$ (CO$_3^-$), τ (D$_2$O) 4.42 (1-proton doublet, J 5 Hz.; C–7 H), 4.88 (1-proton doublet, J 5 Hz.; C–6 H), 6.21, 6.70 [two 1-proton doublets (branches of a quartet), J 17 Hz.; C–2 H$_2$], 6.26, 6.72 [two 1-proton doublets (branches of a quartet), J 14 Hz., C–3 CH$_2$], 8.00 (3-proton singlet; CH$_3$S). [Found: C, 41.5; H, 4.0; N, 10.8; S, 16.8; Na, 6.3. C$_{12}$H$_{12}$N$_3$O$_4$S$_2$Na (349.4) requires C, 41.2; H, 3.4; N, 12.0; S, 18.3; Na, 6.6%].

An attempt to conduct this acylation in aqueous bicarbonate-acetone solution failed completely.

EXAMPLE 22

3-methylthiomethyl-7β-phenylglyoxamidoceph-em-4-carboxylic acid

Phenylglyoxalyl chloride (1.85 g., 0.011 mole) in acetone (15 ml.) was added over 10 min. to a cold (0–5°) stirred solution of 7β-amino-3-methylthiomethylceph-3-em-4-carboxylic acid (2.60 g., 0.01 mole) and sodium bicarbonate (2.52 g. 0.03 mole) in water (30 ml.) and acetone (30 ml.) The mixture was stirred for 40 min. at 0–5°, then the acidic material was recovered in the usual way as a golden foam (1.87 g.), TLC R$_F$ 0.53 (impurities at 0.40 and 0.82). This gum was dissolved in acetone (10 ml.) and the solution treated with dicyclohexylamine (1.2 ml.). After refrigeration for 1 hr. the precipitate was collected by filtration, washed with acetone and ether, then dried giving the dicyclohexylammonium salt as an off-white powder (2.23 g.). This was dissolved in 0.5 N hydrochloric acid (40 ml.) and ethyl acetate (40 ml.), and the acidic material recovered in the usual way as a pale yellow powder (0.70 g.). This was stirred in ether (40 ml.) for 2 hrs. and the solid recovered by filtration, giving 3-methylthiomethyl-7β-phenylglyoxamidoceph-3-em-4-carboxylic acid (0.43 g.), TLC R$_F$ 0.53 (trace impurity at 0.40), $R_F$ 0.89 (system 2), $R_F$ 0.70 (system 1) (trace impurity at 0.18), M.P. 118–124° (decomp.), $[\alpha]_D$ +16.5° (c. 1.00 dioxan), $\lambda_{max}$ (ethanol) 227 nm. ($\epsilon$ 18,400), $\nu_{max}$ (CHMr₃) 1770, ($\beta$-lactam), 1725 ($CO_2H$), 1670, 1510 cm.$^{-1}$ (CONH), $\tau$ (D₂O with NaHCO₃) 2.42 (5-proton singlet; phenyl protons), 4.24 (1-proton doublet, J 5 Hz., C–7 H), 4.81 (1-proton doublet, J 5 Hz.; C–6 H), 6.23, 6.70 [two 1-proton doublets (branches of a quartet), J 14 Hz., C–3 CH₂], 6.27, 6.72 [two 1-proton doublets (branches of a quartet), J 17 Hz., C–2 H₂], 7.98 (3-proton singlet; CH₃S). [Found: C, 52.1; H, 4.2; N, 6.7; S, 15.2. $C_{17}H_{16}N_2O_5S_2$ (392.5) requires C, 52.0; H, 4.1; N, 7.1; S, 16.3%].

EXAMPLE 23

3-methylsulphonylmethyl-7$\beta$-(2'-thienylacetamido) ceph-3-em-4-carboxylic acid 3 - acetoxymethyl-7$\beta$-(2'-thienylacetamido)ceph-3-em-4 - carboxylic acid (21.0 g.) was dissolved in water (1.1 litres) at pH 6.2. Magnesium methylsulphinate (27.5 g. 3 equivalents) was added, taking the pH to 3.2. The solution was stirred at 71–73° for 3 hours. On cooling the reaction mixture was washed with ethylacetate at pH 6, acidified to pH 2.0, and extracted into ethyl acetate. The organic layer was washed, dried, and evaporated to small bulk, when crystals were obtained: (3.2 g.). These were recrystallised from methanol as prisms (1.7 g.), M.P. 160–160.5, $[\alpha]_D^{22}$+20° (c. 0.94; tetrahydrofuran), $\lambda\lambda_{max}$ (pH 6; 0.02 M-aqueous phosphate) 238 nm. ($\epsilon$ 14,150), 265 ($\epsilon$ 10,400), $\nu_{max}$ (Nujol) 3260, 1790, 1760, 1720, 1658, 1540, 1300, and 1120 cm.$^{-1}$, $\tau$ (d6–DMSO) 2.5–3.0 (3-proton multiplet), 4.29 (1-proton double doublet, J 4.5, 9.0 Hz.), 0.93 (1-proton doublet, J 9.0 Hz.), 4.81 (1-proton doublet, J 4.5 Hz.), 5.4 and 5.7 (2 protons, probably a quartet-outer branches obscured), ~6.2 (4 protons), (Found: C, 43.4; H, 4.1; N, 6.4; S, 22.7. $C_{15}H_{16}N_2O_6S_3$ requires C, 43.2; H, 3.9; N, 6.7; S, 23.0%). $R_F$ 0.17 (system 1), 0.21 (system 3).

EXAMPLE 24

3-methylsulphonylmethyl-7-$\beta$-phenylacetamidoceph-3-em-4-carboxylic acid

Sodium 3 - acetoxymethyl - 7$\beta$-phenylacetamidoceph-3-em-4-carboxylate (10.588 g., 25.68 mmole) was dissolved in water (500 ml.) and the pH adjusted to 6.2. Magnesium methylsulphinate (16.58 g., 90.44 mmole) was added, the solution stirred for 3 hrs. at 70–80°, cooled, and washed with ethyl acetate (2× 250 ml.). The aqueous solution was acidified (pH2) with 2 N-hydrochloric acid, extracted with ethyl acetate (2× 250 ml.), and the combined organic extracts washed with water (2× 200 ml.), brine (2× 100 ml.), dried, and evaporated to dryness in vacuo. The residue was dissolved in 2 N-sodium bicarbonate (250 ml.), the alkaline solution washed with ethyl acetate (100 ml.), acidified (pH 2) with 2 N-hydrochloric acid, and extracted with ethyl acetate (2× 250 ml.) The combined extracts were washed with water (100 ml.) and brine (100 ml.), dried, and evaporated to a small volume. The white solid which separated was collected by filtration and recrystallised from ethanol to give white crystals (1.13 g., 10%) of the title compound, M.P. 197–202°, $[\alpha]_D^{22}$ +31° (c. 1.0, dioxan), $\nu_{max}$ (Nujol) 3290 (—NH), 1782 ($\beta$-lactam), 1730

(—$CO_2H$)

1650 and 1530 (—CONH), and 1380 and 1180 cm.$^{-1}$ (—SO₂) $\lambda_{max}$ (pH 6 phosphate) 264 nm. ($\epsilon$ 8,700), $\tau$(D₂O; Na HCO₃); 6.94 (3-proton singlet), 6.56 (2-proton, quartet, J 18 Hz.), 6.42 (2-proton singlet), 5.60 (2-proton quartet), 4.96 (1-proton doublet, J 5 Hz.), 4.31 (1-proton doublet, J 5 Hz.), 2.70 (5-proton singlet) (Found: C, 50.1; H, 4.5; N, 6.5; S, 15.2; $C_{17}H_{18}N_2O_6S_2$ requires C, 49.7; H, 4.4; N, 6.8; S, 15.6%). $R_F$ 0.16 (system 1), 0.14 (system 3).

EXAMPLE 25

7$\beta$-benzylthiomethylcarbonamide-3-methylsulphonyl-methylceph-3-em-4-carboxylic acid Sodium 3 - acetoxymethyl - 7$\beta$-benzylthiomethylcarbonamidoceph-3-em - 4 - carboxylate (10.637 g., 24.38 mmole) was dissolved in water (500 ml.) and the pH adjusted to 6.2. Magnesium methylsulphinate (13.4 g., 73.14 mmole) was added, the solution stirred 3 hr. at 70–80°, cooled, and washed with ethyl acetate (2× 250 ml.). The aqueous solution was acidified (pH2) with 2 N-hydrochloric acid, extracted with ethyl acetate (3 × 250 ml.), the organic extracts combined, washed with water (250 ml.) and brine (250 ml.), dried, and evaporated to a small volume. The white solid was recrystallised from ethanol to give white crystals (970 mg., 9%) of the title compound, M.P. 168–170°, $[\alpha]_D^{22}$ +54° (c. 1.02, dioxan), $\nu_{max}$ (Nujol) 3280 (—NH), 1780 ($\beta$-lactam), 1730 (—$CO_2H$), 1660 and 1540 (—CONH), and 1373 and 1170 cm.$^{-1}$ (—SO₂-), $\lambda\lambda_{max}$ (pH6 phosphate), 211 nm. ($\epsilon$ 15,600), 264 nm. ($\epsilon$ 10,800), $\tau$(d6–DMSO) 8.91 (1.5-proton triplet), 6.50 (1-proton quartet) (these signals are due to ethanol of crystallization), 6.96 (3-proton singlet), 6.81 (2-proton singlet), 6.22 (2-proton quartet), 6.13 (2-proton singlet), 5.50 (2-proton quartet), 4.73 (1-proton doublet), 4.22 (1-proton quartet), 2.63 (5-proton singlet), 0.94 (1-proton doublet) (Found: C, 47.7; H, 4.9; N, 5.5; S, 19.6; $C_{18}H_{20}N_2O_6S_3$ ½EtOH requires C, 47.6; H, 4.85; N, 5.8; S, 20.1%). $R_F$ 0.36 (system 1), 0.19 (system 3).

EXAMPLE 26

3-n-propylsulphonylmethyl-7$\beta$-(2'-thienylacetamido) ceph-3-em-4-carboxylic acid A solution of 3 - acetoxymethyl - 7$\beta$-(2'-thienylacetamido)ceph-3-em-4-carboxylic acid (5.24 g.) at pH 6.5 in water (250 ml.) was reacted with magnesium n-propylsulphinate (7.8 g., 3 equiv.) at pH 4.5 and 65–72° during 2 hours. The cooled reaction mixture was washed with ethyl acetate at pH 5.7, acidified to pH 2.0 and extracted into ethyl acetate, which was washed, dried, and concentrated, giving crystals (1.69 g.). The crystals were recrystallised from methanol as prisms (0.99 g.), M.P. 194.5 to 195.5° (decomp.) $\lambda\lambda_{max}$ (pH 6: 0.02 M-aqueous phosphate) 238 mm. ($\epsilon$ 13,600), 264 nm. ($\epsilon$ 9,800), $\nu_{max}$ 1790, 1722, 1651, 1522 cm.$^{-1}$, $\tau$(d₆–DMSO; 100 mHz.) 0.89 (1-proton doublet J 9 Hz.), 2.5–3.2 (3-proton multiplet), 4.3 (1-proton double doublet, J 5, 9 Hz.) 4.81 (1-proton doublet, J 5 Hz.), 5.37 and 5.72 (2-proton quartet, J 14 Hz.), 6.20 (2-proton singlet) 6.18 and 6.4 (2-proton quartet, J 18 Hz.), 6.89 (2-proton quartet) 8.28 (2-proton multiplet), 9.00 (3-proton triplet) (Found: C, 45.9; H, 4.5; N, 6.0; S, 21.3 $C_{17}H_{20}N_2O_6S_3$ requires C, 46.1; H, 4.5; N, 6.3; S, 21.6%) $R_F$ 0.5 (system 1), 0.2 (system 3).

EXAMPLE 27

7$\beta$-phenylacetamido-3-n-propylsulphonylmethylceph-3-em-4-carboxylic acid

Sodium 3 - acetoxymethyl - 7$\beta$-phenylacetamidoceph-3-em-4-carboxylate (4.95 g., 12 mmole), in water (300 ml.) was treated with magnesium n-propylsulphinate (7.61 g., 36 mmole), by the method previously described, to give the title compound (720 mg., 14%), M.P. 205–209° (from ethanol), $[\alpha]_D^{22}$ +48° (c. 0.96, dioxan), $\nu_{max}$ (Nujol) 3285 (—NH), 1800 ($\beta$-lactam), 1732 (—$CO_2H$) and 1670 and 1540 cm.$^{-1}$ (—CONH), $\lambda\lambda_{max}$ (pH 6 phosphate), 208 nm. ($\epsilon$ 15,600), 265 nm. ($\epsilon$ 10,300), $\tau$(d₆–DMSO) 8.91 (1.5-proton triplet), 6.50 (1-proton quartet) (these signals are due to ethanol of crystallization), 9.00 (3-proton triplet), 8.29 (2-proton multiplet), 6.90 (2-proton multiplet), 6.48 (2-proton singlet), 6.43 (2-proton quartet), 5.56 (2-proton quartet, J 14 Hz.), 4.86 (1-proton doublet, J 5 Hz.), 4.32 (1-proton quartet, J 5 and 8 Hz.). (Found: C, 52.0; H, 5.1; N, 59; S, 14.0; $C_{19}H_{22}N_2O_6S_2 \cdot \frac{1}{2}EtOH$ requires C, 52.0; H, 5.5; N, 6.1; S, 13.9%) $R_F$ 0.47 (system 1), 0.35 (system 3).

EXAMPLE 28

7β-bromoacetamido-3-methylthiomethylceph-3-em-4-carboxylic acid

A suspension of 7β-amino-3-methylthiomethylceph-3-em-4-carboxylic acid (2.6 g.) in dry acetonitrile (37.5 ml.) containing N,N-dimethylacetamide was cooled to 0° and treated with bromoacetyl bromide (0.92 ml., 1.05 equivs.). The mixture was stirred at 0° until solution of the acid was complete (ca. 30 minutes). The solvents were removed in vacuo and the residue diluted with water and taken to pH 1 with sulphuric acid. The insoluble material was taken up in ether-ethyl acetate (1:1) and the organic phase extracted with 5%-aqueous sodium bicarbonate (50 ml.) at 0°. The equeous phase was washed with ether and ethyl acetate, and dissolved organic solvents were removed in vacuo. The alkaline solution was taken to pH 2 with sulphuric acid, and the precipitated solid (980 mg.) filtered off and dried in vacuo. (Found: Br, 12) ($C_{11}H_{13}BrN_2O_4S_2$ requires Br, 21%). The filtrate was cooled to 0°, and the solution saturated with sodium bromide, then extracted with ether containing some ethylacetate. The organic layer, on evaporation, gave the bromoacetamide (1.7 g.) as a pale yellow solid, M.P. 100° (decomp.)$\lambda_{max.}$ 265 nm. ($\epsilon$ 8,080) (Found: Br, 28.8; S, 13.8%). Crystallisation, twice, from a large volume of ether gave pure 7β-bromoacetamido-3-methylthiomethylceph-3-em-4-carboxylic acid (510 mg.) as small prisms, M.P. 124–126° (decomp.), $[\alpha]_D +31.3°$ (C. 1.3, N,N-dimethylformamide), $\lambda_{max.}$ 264 nm. ($\epsilon$ 8,450). Found: C, 35.3; H, 3.6; Br, 20.1; N, 6.7; S, 16.2. $C_{11}H_{13}BrN_2O_4S_2$ requires C, 34.6; H, 3.4; Br, 21.0; N, 7.4; S, 16.8%.

EXAMPLE 29

7β-(D-5′-benzamido-5′-carboxypentanamido)-3-methylthiomethylceph-3-em-4-carboxylic acid

3-acetoxymethyl-7β-(D-5′-benzamido-5′-carboxypentanamido)ceph-3-em-4-carboxylic acid disodium salt (5.63 g., 0.01 mole) in water (50 ml.) was treated with methanethiol (1.46 g., 0.03 mole) in a sealed glass tube at 70° for 3 hr. The impure acidic product, 7β-(D-5′-benzamido-5′-carboxypentamido)-3-methylthiomethylceph-3-em-4-carboxylic acid, was obtained as a colourless foam (3.14 g.), $B_F$ 0.09 and several minor spots (system 1) (N-benzoylcephalosporin C has $R_F$ 0.02), $R_F$ 0.87 (system 2), $\nu_{max.}$ (Nujol) 1755 (β-lactam), 1720 ($CO_2H$), 1640, 1536 cm.$^{-1}$ (CONH) $\tau$ ($D_2O$ with $NaHCO_3$) 2.18, 2.44 (5-proton multiplet, aromatic protons), 4.44 (1-proton doublet, J 5 Hz.; C–7 H), 4.93 (1-proton doublet, J 5 Hz.; C–6 H), 5.56 (1-proton multiplet;

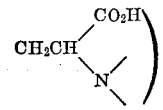

6.27, 6.68 [two 1-proton doublets (branches of a quartet), J 14 Hz.; C–3 $CH_2$], 6.40, 6.87 [two 1-proton doublets (branches of a quartet), J 17 Hz.; C–2 $H_2$], 7.58 (2-proton multiplet; $CH_2CONH$), 7.98 (3-proton singlet; $SCH_3$), ~8.1 (4-proton multiplet; $CH_2CH_2CH_2CONH$), with further peaks due to ethyl acetate and other trace impurities.

Biological results of the compounds prepared in the examples are given in Table I below.

| Compound of Example No. | Tube dilution assay (γ/ml.) | | | | | | | Mouse protection ($ED_{50}$/mg./kg./dose) S. aureus subcutaneous 11127 | ROUR [1] |
| | Gram positive | | | | Gram negative | | | | |
| | S. aureus 604 | S. aureus 663 | S. aureus 3452 | S. aureus 11127 | E. coli 573 | S. typhimurium 804 | Pr. mirabilis 431 | | |
| 1 | >2.5 | 0.16 | 16 | | 125 | 125 | 125 | 50 | 1.5 |
| 2 | 0.16 | <0.05 | 8 | | >250 | >250 | >250 | | 1.5 |
| 3 | 2.5 | 0.08 | 16 | 16 | 250 | 250 | 250 | 9 | 3.1 |
| 5 | 2.5 | <0.005 | 8 | 16 | 250 | 125 | 250 | <6 | 10 |
| 7 | 1.25 | 0.04 | 125 | 125 | 250 | 250 | 250 | >50 | 7 |
| 8 | 1.25 | 0.08 | 31 | 125 | 250 | 250 | 250 | >50 | 6 |
| 9 | 2.5 | 0.31 | 16 | 8 | 250 | 250 | 250 | >50 | 4 |
| 10 | 0.3 | 0.16 | 1.0 | 0.5 | 125 | 125 | <4 | 18 | 1 |
| 11 | >2.5 | >2.5 | 16 | 16 | 62 | 8 | <4 | ~50 | 1 |
| 12 | 0.6 | 0.1 | 4 | 31 | >250 | >250 | >250 | >50 | 1 |
| 13 | 0.16 | 0.01 | <0.5 | <0.5 | >250 | >250 | >250 | >50 | 3.8 |
| 14 | 1.25 | 0.16 | 2 | 2 | 125 | 62 | 62 | 40 | 0.9 |
| 16 | 0.08 | 0.08 | <0.5 | <0.5 | >250 | >250 | >250 | 25 | 2.6 |
| 17 | 2.5 | 1.25 | 2 | 2 | 250 | 125 | 250 | >50 | 5.0 |
| 18 | 1.25 | 0.62 | 2 | 2 | 125 | 250 | 125 | >50 | 3.3 |
| 19 | 2.5 | 0.31 | 4 | 1 | 125 | 125 | 125 | 50 | 4.7 |
| 20 | 2.5 | 0.16 | 2 | 2 | 250 | 250 | 250 | ~25 | 5.9 |
| 21 | >2.5 | 2.5 | 0.5 | 4 | 250 | 250 | 125 | >50 | 2.3 |
| 22 | >2.5 | 1.25 | 16 | 4 | 250 | >250 | >250 | >50 | 6.9 |
| 23 | >2.5 | 1.25 | 4 | 2 | 31 | 125 | 250 | >50 | 1 |
| 24 | >2.5 | 0.08 | 4 | 2 | >250 | >250 | >250 | >50 | 1 |
| 25 | >2.5 | 0.04 | 2 | 16 | >250 | >250 | >250 | >50 | 1.5 |
| 26 | 3.1 | 0.2 | 2 | 1 | 125 | 125 | 62 | | 1.5 |
| 28 | >2.5 | >2.5 | 16 | 8 | 16 | 31 | 31 | >50 | 1.7 |

[1] ROUR = Percent recovery of the antibiotic from the urine of female rats following oral administration of the antibiotic.

Pharmaceutical examples (A) Tablet:

|  | Mg. |
|---|---|
| (a) 3-methylthiomethyl-7β-(2′-thienylacetamido) ceph-3-em-4-carboxylic acid | 250 |
| (b) Mannitol | 75 |
| (c) Potato starch | 46 |
| (d) Maize starch | 25 |
| (e) Magnesium stearate | 4 |

The dry ingredients (a), (b) and (c) were blended together and granulated with a 10% aqueous paste of (d). The granules were passed through a No. 12 mesh (B.S.) screen, dried to constant weight and sieved through a No. 16 mesh (B.S.) screen. The granules were then lubricated by blending in (e) and compressed at 400 mg. per tablet on suitable punches. The tablets may be coated if required, for instance with a readily soluble conventional film coating.

(B) Capsule:

|  | Mg. |
|---|---|
| 3-Methylthiomethyl-7β-(2′-thienylacetamido) ceph-3-em-4-carboxylic acid | 250 |
| Aerosil [1] composition | 3 |

The dry powders were blended together homogeneously and distributed into well filled, hard-gelatin capsules, so that each contained 250 mg. of the active ingredient.

[1] A silicon dioxide/starch blend available from Bush, Beach and Gent of Marlon House, Lloyd's Avenue, London, E.C.3.

(C) Veterinary product—Intramammary preparation:

| | Mg. |
|---|---|
| 3 - Methylthiomethyl-7β-(2'-thienylacetamido) ceph - 3 - em-4-carboxylic acid (sterile) | 100 |

Aluminium stearate (3% w./w.) gel in liquid paraffin to make up to 3 g.

The gel base was prepared in a conventional manner by distributing the aluminium stearate in the oil and heating, with stirring, until gelling took place. The base was further heated under sealed conditions to effect sterilization and thereafter subjected to rapid cooling without stirring, to produce a thick gel. The active ingredient was incorporated into the required amount of base under aseptic conditions, suitable stirring and refining processes being used to ensure a homogeneous mix. The product was distributed into sterilized tubes with suitable applicator nozzles for intramammary use, so that a quantity of 3 g. could be extruded from each tube.

We claim:

1. A compound of the formula

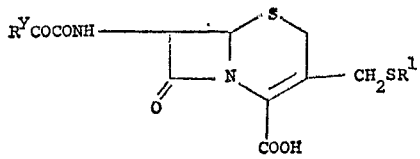

where $R^y$ is thienyl; phenyl or phenyl mono-, di- or tri-substituted by halo, lower alkoxy, lower alkyl or amino and $R^1$ is alkyl of 1 to 4 carbon atoms or alkyl of 1 to 4 carbon atoms substituted by carboxy, carboalkoxy ($C_2$–$C_5$) or mercapto; or a non-toxic salt of said compound.

2. The oxime, semicarbazone, thiosemicarbazone, isonicotinoyl hydrazone or hydrazone of a compound as defined in claim 1.

3. A compound of the formula

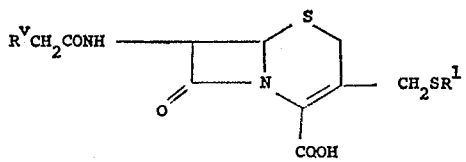

where $R^v$ is thienyl, furyl, benzylthio, phenoxy or phenyl substituted by halo, nitro, lower alkanoyloxy, lower alkanoyl or hydroxy and $R^1$ is alkyl of 1 to 4 carbon atoms or alkyl of 1 to 4 carbon atoms substituted by carboxy, carboalkoxy ($C_2$–$C_5$) or mercapto; or a non-toxic salt of said compound.

4. The compound of claim 3 which is 3-ethylthiomethyl-7β-(2'-thienylacetamido)ceph-3-em-4-carboxylic acid.

5. The compound of claim 3 which is 3-n-propylthiomethyl-7β-(2' - thienylacetamido) ceph-3-em-4-carboxylic acid.

6. The compound of claim 3 which is 3 - methyl-thiomethyl - 7β - (2'-thienylacetamido)ceph-3-em-4-carboxylic acid.

7. The compound of claim 3 which is 3-n-butylthiomethyl - 7β - 2'-thienylacetamido)ceph-3-em-4-carboxylic acid.

8. The compound of claim 3 which is 3-(1'-methylpropylthiomethyl)-7β-(2'-thienylacetamido) ceph-3-em-4-carboxylic acid.

9. The compound of claim 3 which is 3-t-butylthiomethyl - 7β-(2'-thienylacetamido)ceph-3-em-4-carboxylic acid.

10. The compound of claim 3 which is 3-methoxycarbonylmethylthiomethyl-7β-(2'-thienylacetamido) ceph-3-em-4-carboxylic acid.

11. The compound of claim 3 which is 3-carboxymethylthiomethyl - 7β - (2'-thienylacetamido)ceph-3-em-4-carboxylic acid.

12. The compound of claim 3 which is 3-(2'-mercaptoethylthiomethyl) - 7β-(2'-thienylacetamido)ceph-3-em-4-carboxylic acid.

13. The compound of claim 3 which is 7β-(2'-furylacetacetamido) - 3-methylthiomethylceph-3-em-4-carboxylic acid.

14. The compound 3 - methylthiomethyl - 7β-vinylacetamidoceph-3-em-4-carboxylic acid.

15. The compound 7β - (S-methylthiomethylcarbonamido) - 3 - methylthiomethyl-ceph-3-em-4-carboxylic acid.

16. The compound 7β - azidoacetamido-3-methylthiomethylceph-3-em-4-carboxylic acid.

17. The compound 7β - cyanoacetamido-3-methylthiomethylceph-3-em-4-carboxylic acid.

18. The compound 7β-bromoacetamido-3-methylthiomethylceph-3-em-4-carboxylic acid.

19. The compound of claim 3 which is 7β-(S-benzylthiomethylcarbonamido) - 3-n-propylthiomethyl ceph-3-em-4-carboxylic acid.

20. The compound of claim 3 which is 7β-(S-benzylthiomethylcarbonamido)-3-methylthiomethyl ceph-3-em-4-carboxylic acid.

21. The compound of claim 3 which is 3-methylthiomethyl - 7β - phenoxyacetamidoceph-3-em-4-carboxylic acid.

22. The compound 7β - (D-5'-benzamido-5'-carboxypentanamido)-3-methylthiomethylceph-3-em-4-carboxylic acid.

23. The compound of claim 1 which is 3-methylthiomethyl - 7β-phenylglyoxamidoceph-3-em-4-carboxylic acid.

References Cited

UNITED STATES PATENTS 3,516,997   6/1970   Takano et al. _____ 260—243 C

NICHOLAS S. RIZZO, Primary Examiner

U.S. Cl. X.R.

424—246

Disclaimer 3,647,788.—*John Colin Clark*, Gerrards Cross, *Brian Richard Cowley*, Greenford, *Gordon Ian Gregory*, Chalfont St. Peter, England, and *James Kennedy*, Montrose, Angus, Scotland, and *Alan Gibson Long*, Greenford, England. CEPHALOSPORINS HAVING A 3-THIOETHER GROUP. Patent dated Mar. 7, 1972. Disclaimer filed Sept. 13, 1972, by the assignee, *Glaxo Laboratories Limited*.

Hereby enters this disclaimer to claims 3 and 4 of said patent.

[*Official Gazette January 16, 1973.*]